(12) United States Patent
Merritt et al.

(10) Patent No.: US 12,458,447 B2
(45) Date of Patent: Nov. 4, 2025

(54) CO-REGISTRATION OF INTRAVASCULAR DATA AND MULTI-SEGMENT VASCULATURE, AND ASSOCIATED DEVICES, SYSTEMS, AND METHODS

(71) Applicant: PHILIPS IMAGE GUIDED THERAPY CORPORATION, San Diego, CA (US)

(72) Inventors: Fergus Merritt, Gold River, CA (US); Bernhard Sturm, Davis, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 416 days.

(21) Appl. No.: 17/774,009

(22) PCT Filed: Nov. 6, 2020

(86) PCT No.: PCT/EP2020/081333
§ 371 (c)(1),
(2) Date: May 3, 2022

(87) PCT Pub. No.: WO2021/089810
PCT Pub. Date: May 14, 2021

(65) Prior Publication Data
US 2022/0395333 A1    Dec. 15, 2022

Related U.S. Application Data

(60) Provisional application No. 62/931,693, filed on Nov. 6, 2019.

(51) Int. Cl.
*A61B 34/20* (2016.01)
*A61B 6/00* (2006.01)
(Continued)

(52) U.S. Cl.
CPC ............... *A61B 34/20* (2016.02); *A61B 6/12* (2013.01); *A61B 6/463* (2013.01); *A61B 6/504* (2013.01);
(Continued)

(58) Field of Classification Search
CPC ........... A61B 34/20; A61B 6/12; A61B 6/463; A61B 6/504; A61B 6/5241; A61B 6/547; A61B 8/0891; A61B 8/12
See application file for complete search history.

(56) References Cited

U.S. PATENT DOCUMENTS 6,200,268 B1   3/2001   Vince
6,381,350 B1   4/2002   Klingensmith
(Continued)

OTHER PUBLICATIONS

International Search Report and Written Opinion of PCT/EP2020/081333, dated Feb. 3, 2021.

*Primary Examiner* — Pascal M Bui Pho
*Assistant Examiner* — Gabriel Victor Popescu

(57) ABSTRACT

Disclosed is a medical imaging system, including a processor circuit configured for communication with an x-ray imaging device movable relative to a patient and an intravascular catheter or guidewire sized and shaped for positioning within a blood vessel of the patient, wherein the processor circuit is configured to receive a first angiographic image of a first length of the vessel and a second angiographic image of a second length of the vessel, wherein the first image is obtained at a first position and the second angiographic image is obtained at a second position. The processor is further configured to generate a roadmap image of a combined length of the blood vessel by combining the first image and the second image, and to receive intravascular data associated with the blood vessel, and to co-register the intravascular data to corresponding locations in the roadmap image; and output the roadmap image and a (Continued)

graphical representation of the intravascular data at the corresponding locations in the roadmap image.

13 Claims, 13 Drawing Sheets

(51) Int. Cl.
| | | |
|---|---|---|
| *A61B 6/12* | (2006.01) | |
| *A61B 6/46* | (2024.01) | |
| *A61B 6/50* | (2024.01) | |
| *A61B 8/08* | (2006.01) | |
| *A61B 8/12* | (2006.01) | |
| *G06T 3/20* | (2006.01) | |
| *G06T 3/60* | (2006.01) | |
| *G06T 7/33* | (2017.01) | |

(52) U.S. Cl.
CPC ............ *A61B 6/5241* (2013.01); *A61B 6/547* (2013.01); *A61B 8/0891* (2013.01); *A61B 8/12* (2013.01); *G06T 3/20* (2013.01); *G06T 3/60* (2013.01); *G06T 7/33* (2017.01); *A61B 2034/2051* (2016.02); *A61B 2562/0247* (2013.01); *G06T 2207/10116* (2013.01); *G06T 2207/30101* (2013.01)

(56) References Cited

U.S. PATENT DOCUMENTS

| | | |
|---|---|---|
| 7,074,188 B2 | 7/2006 | Nair |
| 7,175,597 B2 | 2/2007 | Vince |
| 7,215,802 B2 | 5/2007 | Klingensmith |
| 7,359,554 B2 | 4/2008 | Klingensmith |
| 7,463,759 B2 | 12/2008 | Klingensmith |
| 7,522,701 B2 | 4/2009 | Jensen |
| 7,930,014 B2 | 4/2011 | Huennekens |
| 8,298,147 B2 | 10/2012 | Huennekens |
| 9,907,527 B2 | 3/2018 | Dascal |
| 2006/0241465 A1* | 10/2006 | Huennekens ............ A61B 5/06 600/458 |
| 2007/0140427 A1* | 6/2007 | Jensen .................... A61B 6/504 378/98.12 |
| 2012/0059253 A1 | 3/2012 | Wang |
| 2017/0140531 A1 | 5/2017 | Dascal |
| 2017/0213358 A1* | 7/2017 | Furuichi ................ A61B 8/463 |
| 2019/0029624 A1* | 1/2019 | Kunio .................... A61B 90/39 |
| 2020/0155120 A1 | 5/2020 | Nijhof |

* cited by examiner

CO-REGISTRATION OF INTRAVASCULAR DATA AND MULTI-SEGMENT VASCULATURE, AND ASSOCIATED DEVICES, SYSTEMS, AND METHODS

TECHNICAL FIELD

The subject matter described herein relates to a system for medical imaging and data collection. In particular, the disclosed system provides a system for co-registering intraluminal medical data with extraluminal medical images. This system has particular but not exclusive utility for diagnosis and treatment of vascular diseases.

BACKGROUND

Various types of intraluminal (also referred to as intravascular) imaging and measurement systems are used in diagnosing and treating diseases. For example, intravascular ultrasound (IVUS) imaging is widely used in interventional cardiology as a diagnostic tool for visualizing vessels within a body of a patient. This may aid in assessing diseased or compressed vessels, such as an arteries and veins within the human body, to determine the need for treatment, to optimize treatment, and/or to assess the effectiveness of treatments such as angioplasty and stenting, IVC-filter retrieval, EVAR and FEVAR (and similar on the abdominal trait) atherectomy. Different diseases or medical procedures produce physical features with different size, structure, density, water content, and accessibility for imaging sensors. For example, a deep-vein thrombosis (DVT) produces a clot of blood cells, whereas post-thrombotic syndrome (PTS) produces webbing or other residual structural effects in a vessel that have similar composition to the vessel wall itself, and may thus be difficult to distinguish from the vessel wall. A stent is a dense (e.g., metallic) object that may be placed in a vessel or lumen to hold the vessel or lumen open to a particular diameter. A compression occurs when anatomical structures outside the vessel or lumen impinge on the vessel or lumen, constricting it. A thrombus occurs when material (e.g., blood clot material) accumulates within the lumen of a vessel. Compression and thrombus are both examples of stenosis, e.g., a narrowing of the vessel.

In some cases, intraluminal medical imaging is carried out with an IVUS device including one or more ultrasound transducers. The IVUS device may be passed into the vessel and guided to the area to be imaged. The transducers emit ultrasonic energy and receive ultrasound echoes reflected from the vessel and surrounding tissue. The ultrasound echoes are processed to create an image of the vessel of interest and surrounding tissue. The image of the vessel of interest may include one or more lesions or blockages in the vessel. A stent may be placed within the vessel to treat these blockages and intraluminal imaging may be carried out to view the placement of the stent within the vessel. Other types of treatment include thrombectomy, ablation, angioplasty, pharmaceuticals, etc.

In the field of intravascular imaging and physiology measurement, co-registration of data from invasive devices (e.g. IVUS catheter, iFR wire) with images collected non-invasively (e.g. via x-ray angiography) is a technique for improving the efficiency and accuracy of vascular catheterization procedures. In peripheral vasculature catheterization procedures it is sometimes necessary to visualize the blood vessel(s) of interest by moving the x-ray sensor along the anatomy while the images are being captured. With the moving x-ray image capture there is no single contrast-filled x-ray frame that can serve as the 'roadmap' for the co-registration, thus making co-registration difficult.

The information included in this Background section of the specification, including any references cited herein and any description or discussion thereof, is included for technical reference purposes only and is not to be regarded as subject matter by which the scope of the disclosure is to be bound.

SUMMARY

Disclosed is a system for advantageously co-registering data from intravascular devices with multiple external x-ray images obtained at multiple scanner positions. The current disclosure provides a system, apparatus, and method for deriving more accurate co-registration based on stitching together multiple x-ray images. The method can be applied to any body lumen but is particularly relevant to, and represents a substantial improvement for, peripheral vasculature, where vessels are long enough that mapping them may require multiple external images (e.g., angiographic x-ray images). The system is hereinafter referred to as an intravascular co-registration system.

The intravascular co-registration system disclosed herein has particular, but not exclusive, utility for intraluminal ultrasound imaging procedures. The intravascular co-registration system includes a system, including: a processor circuit configured for communication with an x-ray imaging device movable relative to a patient and an intravascular catheter or guidewire sized and shaped for positioning within a blood vessel of the patient, where the processor circuit is configured to: receive a first angiographic image of a first length of the blood vessel and a second angiographic image of a second length of the blood vessel, where the first angiographic image is obtained with the x-ray imaging device at a first position relative to the patient and the second angiographic image is obtained at a second position relative to the patient; generate a roadmap image of a combined length of the blood vessel by combining the first angiographic image and the second angiographic image; receive intravascular data associated with the blood vessel, where the intravascular data is obtained by the intravascular catheter or guidewire while the intravascular catheter or guidewire is positioned within the blood vessel; co-register the intravascular data to corresponding locations of the blood vessel in the roadmap image; and output, to a display in communication with the processor circuit, a screen display including: the roadmap image; and a graphical representation of the intravascular data at the corresponding locations in the roadmap image. Other embodiments of this aspect include corresponding computer systems, apparatus, and computer programs recorded on one or more computer storage devices, each configured to perform the actions of the methods.

Implementations may include one or more of the following features. The system where generating the roadmap image includes at least one of rotating or translating the first angiographic image and the second angiographic image such that the first angiographic image and the second angiographic image are in a same coordinate system. The system where generating the roadmap image includes: identifying an image landmark that is common to the first angiographic image and the second angiographic image; and rotating and/or translating at least one of the first angiographic image or the second angiographic image such that the image landmark in the first angiographic image is aligned with the image landmark in the second angiographic image. The system where the processor circuit is further configured to: identify a real-time set of positions and/or orientations of the x-ray imaging device while the intravascular catheter or guidewire is positioned within the blood vessel of the patient; calculate a location of the intravascular catheter or guidewire using the real-time set of positions and/or orientations of the x-ray imaging device and live imaging from the x-ray imaging device of the intravascular catheter or guidewire within the blood vessel, where the live imaging is different from the first and second angiographic images; provide the location of the intravascular catheter or guidewire in a coordinate system of the roadmap image; and output, to the display, an indicator of the location of the intravascular catheter or guidewire on the roadmap image, at a position on the roadmap image corresponding to the location of the intravascular catheter or guidewire within the blood vessel. The system where the processor circuit is further configured to, in real time: recalculate the location of the intravascular catheter or guidewire as the intravascular catheter or guidewire is moved within the blood vessel of the patient; provide the recalculated location of the intravascular catheter or guidewire in the coordinate system of the roadmap image; and update, on the display, the indicator of the location of the intravascular catheter or guidewire on the roadmap image. The system where the intravascular catheter or guidewire includes an imaging sensor configured to obtain imaging data, and where the processor circuit is further configured to: generate a cross-sectional image based on the imaging data at a location of the intravascular catheter or guidewire within the blood vessel of the patient; and output, to the display, the cross-sectional image along with the roadmap image. The system where the imaging sensor is an ultrasound sensor or optical coherence tomography sensor. The system where the intravascular catheter or guidewire includes a physiological sensor configured to measure physiological data from the blood vessel at a location of the intravascular catheter or guidewire within the blood vessel, and where the processor circuit is further configured to: receive the physiological data from the physiological sensor; and output, to the display, a graphical representation associated with the physiological data at a position on the roadmap image corresponding to the location of the intravascular catheter or guidewire within the blood vessel of the patient where the physiological data was measured. The system where the physiological sensor is a pressure sensor or a flow sensor. The system where the processor circuit is further configured to compute a physiological quantity based on the physiological data measured at one or more locations, and where the graphical representation is based on the physiological quantity. Implementations of the described techniques may include hardware, a method or process, or computer software on a computer-accessible medium.

One general aspect includes a method, including: receiving, at a processor circuit configured for communication with an x-ray imaging device movable relative to a patient and an intravascular catheter or guidewire sized and shaped for positioning within a blood vessel of the patient, a first angiographic image of a first length of the blood vessel and a second angiographic image of a second length of the blood vessel, where the first angiographic image is obtained with the x-ray imaging device at a first position relative to the patient and the second angiographic image is obtained at a second position relative to the patient; generating, with the processor circuit, a roadmap image of a combined length of the blood vessel by combining the first angiographic image and the second angiographic image; receiving, at the processor circuit, intravascular data associated with the blood vessel, where the intravascular data is obtained by the intravascular catheter or guidewire while the intravascular catheter or guidewire is positioned within the blood vessel; co-registering, with the processor circuit, the intravascular data to corresponding locations of the blood vessel in the roadmap image; and outputting, to a display in communication with the processor circuit, a screen display including: the roadmap image; and a graphical representation of the intravascular data at the corresponding locations in the roadmap image. Other embodiments of this aspect include corresponding computer systems, apparatus, and computer programs recorded on one or more computer storage devices, each configured to perform the actions of the methods.

Implementations may include one or more of the following features. The method where generating the roadmap image includes at least one of rotating or translating the first angiographic image and the second angiographic image such that the first angiographic image and the second angiographic image are in a same coordinate system. The method where generating the roadmap image includes: identifying an image landmark that is common to the first angiographic image and the second angiographic image; and rotating and/or translating at least one of the first angiographic image or the second angiographic image such that the image landmark in the first angiographic image is aligned with the image landmark in the second angiographic image. The method further including: identifying, with the processor circuit, a real-time set of positions and/or orientations of the x-ray imaging device while the intravascular catheter or guidewire is positioned within the blood vessel of the patient; calculating, with the processor circuit, a location of the intravascular catheter or guidewire using the real-time set of positions and/or orientations of the x-ray imaging device and live imaging from the x-ray imaging device of the intravascular catheter or guidewire within the blood vessel, where the live imaging is different from the first and second angiographic images; providing, with the processor circuit, the location of the intravascular catheter or guidewire in a coordinate system of the roadmap image; and outputting, to the display, an indicator of the location of the intravascular catheter or guidewire on the roadmap image, at a position on the roadmap image corresponding to the location of the intravascular catheter or guidewire within the blood vessel. The method further including, in real time: recalculating, with the processor circuit, the location of the intravascular catheter or guidewire as the intravascular catheter or guidewire is moved within the blood vessel of the patient; providing, with the processor circuit, the recalculated location of the intravascular catheter or guidewire in the coordinate system of the roadmap image; and updating, on the display, the indicator of the location of the intravascular catheter or guidewire on the roadmap image. The method where the intravascular catheter or guidewire includes an imaging sensor configured to obtain imaging data, and where the method further includes: generating, with processor circuit, a cross-sectional image based on the imaging data at a location of the intravascular catheter or guidewire within the blood vessel of the patient; and outputting, to the display, the cross-sectional image along with the roadmap image. The method where the intravascular catheter or guidewire includes a physiological sensor configured to measure physiological data from the blood vessel at a location of the intravascular catheter or guidewire within the blood vessel, and where the method further includes: receiving, with the processor circuit, the physiological data from the physiological sensor; and outputting, to the display, a graphical representation associated with the physiological data at a position on the roadmap image corresponding to the location of the intravascular catheter or guidewire within the blood vessel of the patient where the physiological data was measured. The method further including computing, with the processor circuit, a physiological quantity based on the physiological data measured at one or more locations, where the graphical representation is based on the physiological quantity. Implementations of the described techniques may include hardware, a method or process, or computer software on a computer-accessible medium.

One general aspect includes a system including: an intravascular catheter or guidewire configured to be positioned within a peripheral blood vessel of a patient; a processor circuit in communication with the intravascular catheter or guidewire, an x-ray imaging device movable relative to the patient, and a display, where the processor circuit is configured to: receive a plurality of successive medical images obtained by the x-ray imaging device, where each of the plurality of successive medical images respectively includes a different region of the peripheral blood vessel and is obtained at a first set of different positions or orientations relative to the patient; combine the plurality of successive medical images of the peripheral blood vessel into a roadmap image of the peripheral blood vessel using the first set of positions or orientations; receive intravascular data associated with the peripheral blood vessel, where the intravascular data is obtained by the intravascular catheter or guidewire while the intravascular catheter or guidewire is positioned within the peripheral blood vessel; identify a second set of positions and orientations of the x-ray imaging device while the intravascular catheter or guidewire obtains the intravascular data within the peripheral blood vessel; calculate a plurality of locations of the intravascular catheter or guidewire using the second set of positions and orientations of the x-ray imaging device and live imaging from the x-ray imaging device of the intravascular catheter or guidewire within the peripheral blood vessel, where the live imaging is different from the plurality of successive medical images; provide the plurality of locations of the intravascular catheter or guidewire in a coordinate system of the roadmap image of the peripheral blood vessel; and co-register the intravascular data to the plurality of locations of the intravascular catheter or guidewire; and output, to a display in communication with the processor circuit, a screen display including: the roadmap image; and a graphical representation of the intravascular data at the plurality of locations in the roadmap image. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the intravascular co-registration system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
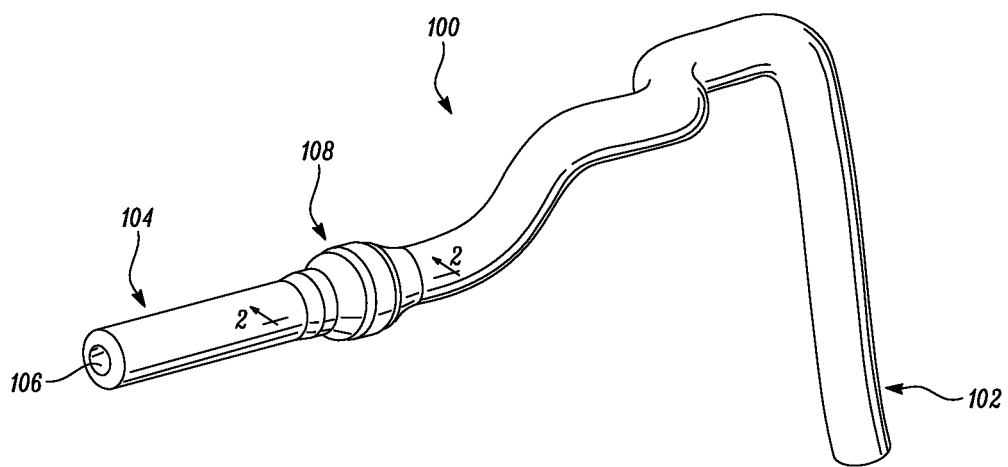
FIG. 1 is a diagrammatic perspective view of a vessel having a stenosis, according to aspects of the present disclosure.

The present disclosure relates generally to medical imaging, including imaging associated with a body lumen of a patient using an intraluminal imaging device.

In some cases, intraluminal imaging is carried out with an IVUS device including one or more ultrasound transducers. The IVUS device may be passed into the vessel and guided to the area to be imaged. The transducers emit ultrasonic energy and receive ultrasound echoes reflected from the vessel and surrounding tissue. The ultrasound echoes are processed to create an image of the vessel of interest and the areas surrounding it. The image of the vessel of interest may include one or more lesions, blockages, and/or other occlusions in the vessel. A stent may be placed within the vessel to treat these blockages, and intraluminal imaging may be carried out to view the placement of the stent within the vessel. Other types of treatment include thrombectomy, ablation, angioplasty, pharmaceuticals, etc. In some embodiments, the vessel may have compression that reduces blood flow.

Disclosed is a system for advantageously co-registering data from intravascular devices with multiple external fluoroscopy images obtained at multiple scanner positions. The current disclosure provides a system, apparatus, and method for deriving more accurate co-registration based on stitching together multiple x-ray images. The method can be applied to any body lumen but is particularly relevant to, and represents a substantial improvement for, peripheral vasculature, where vessels are large enough that mapping them may require multiple external images (e.g., angiographic x-ray images). The system is hereinafter referred to as a intravascular co-registration system. Co-registration technology maps data measured by an intravascular device onto an x-ray image 'roadmap' of the blood vessel in the location where it was measured. This can occur for example during intravascular imaging procedures (e.g., intravascular ultrasound or IVUS, intracardiac echocardiography or ICE, optical coherence tomography or OCT, intravascular photoacoustic or IVPA), pressure measurement procedures (e.g., distal pressure/aortic pressure or Pd/Pa, fractional flow reserve or FFR, instantaneous wave free ratio or iFR), flow measurement procedures (coronary flow reserve or CFR, velocity, and/or volume), temperature measurement procedures, and treatment procedures (e.g., angioplasty, stenting) in coronary arteries and peripheral vasculature. This tells the clinician or other user exactly where in a blood vessel a measurement was made, instead of having to estimate the location based on separate views of the x-ray image and measurement display.

In peripheral vasculature catheterization procedures it is sometimes necessary to visualize the blood vessel(s) of interest by moving an x-ray sensor along the anatomy while the images are being captured. With the moving x-ray image capture there is no single contrast-filled x-ray frame that can serve as the 'roadmap' for the co-registration. This makes co-registration quite difficult, since the roadmap image must fit into a single frame on the display to give the user the ability to navigate to any location in the blood vessel by clicking and dragging on the roadmap. Furthermore, tracking the intravascular device while it's being pulled through a blood vessel in a potentially-moving low-dose x-ray image stream and mapping its position to a stationary roadmap image can be an additional challenge.

The present disclosure discloses a technique for co-registering an intravascular device in a moving x-ray stream by first stitching together the images of the contrast-filled x-ray stream to make a single roadmap image; and then tracking the intravascular device in a low-dose fluoroscopy image stream and mapping its position to the stitched-together roadmap. Both of these mechanisms make use of knowledge of the x-ray sensor position and/or orientation, and (for some embodiments) the detection and identification of physical landmarks in the anatomy.

The algorithm constructs the roadmap image by stitching together the sequence of moving x-ray images using geometric and mathematical techniques. It employs a transformation matrix process based on at least the x-ray sensor parameters (position and/or orientation). Some embodiments also anchor the image based on features detected in the image stream. Other image processing techniques could be used to stabilize the roadmap image and provide enhanced accuracy for the co-registration. The tracking of the intravascular device being pulled through a blood vessel in a low-dose fluoroscopy image stream, and subsequent mapping to the stitched-together roadmap image, employs similar techniques of applying transformation matrices to device positions based on x-ray sensor parameters and other markers detected in the image stream.

The present disclosure substantially aids a clinician in determining the location of intraluminal images and physiological data measurements, by co-registering the intraluminal data with an externally derived (e.g., fluoroscopic x-ray) image of the lumen. Implemented on a medical sensing console (e.g., an IVUS imaging console or intraluminal measurement system) in communication with a medical imaging sensor (e.g., an intraluminal ultrasound sensor or pressure-sensing guidewire), the intravascular co-registration system disclosed herein provides both time savings and an improvement in the location accuracy of intravascular procedures. This improved methodology transforms an imprecise, judgment-driven procedure into a quantitative, repeatable process that requires fewer and simpler steps to be taken by the clinician or other user. This occurs for example without the normally routine need to apply human judgment or vision to estimate where in a lumen the intraluminal probe is located. This unconventional approach improves the functioning of the medical imaging or medical sensing system, by placing all relevant medical information on the same display screen simultaneously, often in a single image.

The intravascular co-registration system may be implemented as a set of logical branches and mathematical operations, whose outputs are viewable on a display, and operated by a control process executing on a processor that accepts user inputs (e.g., from a user interface such as a keyboard, mouse, or touchscreen interface), and that is in communication with one or more medical imaging sensors (e.g., intraluminal ultrasound sensors). In that regard, the control process performs certain specific operations in response to different inputs or selections made by a user at the start of an imaging procedure, and may also respond to inputs made by the user during the procedure. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the intravascular co-registration system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic perspective view of a vessel 100 having a stenosis according to aspects of the present disclosure. The vessel 100 includes a proximal portion 102 and a distal portion 104. A lumen 106 extends along the length of the vessel 100 between the proximal portion 102 and the distal portion 104. In that regard, the lumen 106 is configured to allow the flow of fluid through the vessel. In some instances, the vessel 100 is a blood vessel. In some particular instances, the vessel 100 is a coronary artery. In such instances, the lumen 106 is configured to facilitate the flow of blood through the vessel 100.

As shown, the vessel 100 includes a stenosis 108 between the proximal portion 102 and the distal portion 104. Stenosis 108 is generally representative of any blockage or other structural arrangement that results in a restriction to the flow of fluid through the lumen 106 of the vessel 100. Embodiments of the present disclosure are suitable for use in a wide variety of vascular applications, including without limitation coronary, peripheral (including but not limited to lower limb, carotid, and neurovascular), renal, and/or venous. Where the vessel 100 is a blood vessel, the stenosis 108 may be a result of plaque buildup, including without limitation plaque components such as fibrous, fibro-lipidic (fibro fatty), necrotic core, calcified (dense calcium), blood, fresh thrombus, and mature thrombus. Generally, the composition of the stenosis will depend on the type of vessel being evaluated. In that regard, it is understood that the concepts of the present disclosure are applicable to virtually any type of blockage or other narrowing of a vessel that results in decreased fluid flow.

Figure 2:
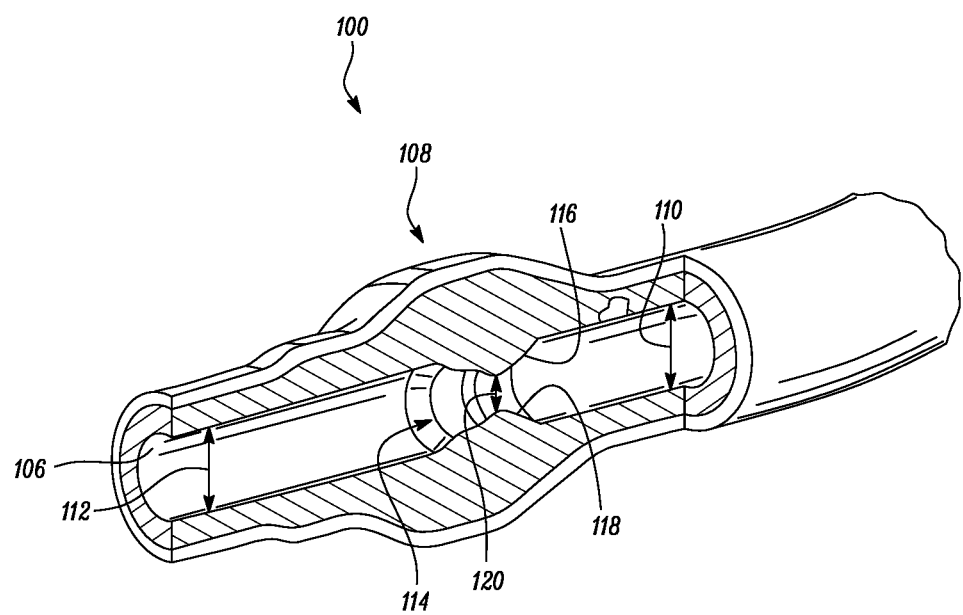
FIG. 2 is a partial cross-sectional perspective view of a portion of the vessel, according to aspects of the present disclosure.

FIG. 2 is a partial cross-sectional perspective view of a portion of the vessel 100 taken along section line 2-2 of FIG. 1, according to aspects of the present disclosure. The lumen 106 of the vessel 100 has a diameter 110 proximal of the stenosis 108 and a diameter 112 distal of the stenosis. In some instances, the diameters 110 and 112 are substantially equal to one another. In that regard, the diameters 110 and 112 are intended to represent healthy portions, or at least healthier portions, of the lumen 106 in comparison to stenosis 108. Accordingly, these healthier portions of the lumen 106 are illustrated as having a substantially constant cylindrical profile and, as a result, the height or width of the lumen has been referred to as a diameter. However, it is understood that in many instances these portions of the lumen 106 will also have plaque buildup, a non-symmetric profile, and/or other irregularities, but to a lesser extent than stenosis 108 and, therefore, will not have a cylindrical profile. In such instances, the diameters 110 and 112 are understood to be representative of a relative size or cross-sectional area of the lumen and do not imply a circular cross-sectional profile.

As shown in FIG. 2, stenosis 108 includes plaque buildup 114 that narrows the lumen 106 of the vessel 100. In some instances, the plaque buildup 114 does not have a uniform or symmetrical profile, making angiographic evaluation of such a stenosis unreliable. In the illustrated embodiment, the plaque buildup 114 includes an upper portion 116 and an opposing lower portion 118. In that regard, the lower portion 118 has an increased thickness relative to the upper portion 116 that results in a non-symmetrical and non-uniform profile relative to the portions of the lumen proximal and distal of the stenosis 108. As shown, the plaque buildup 114 decreases the available space for fluid to flow through the lumen 106. In particular, the cross-sectional area of the lumen 106 is decreased by the plaque buildup 114. At the narrowest point between the upper and lower portions 116, 118 the lumen 106 has a height 120, which is representative of a reduced size or cross-sectional area relative to the diameters 110 and 112 proximal and distal of the stenosis 108. Note that the stenosis 108, including plaque buildup 114 is exemplary in nature and should not be considered limiting in any way. In that regard, it is understood that the stenosis 108 has other shapes and/or compositions that limit the flow of fluid through the lumen 106 in other instances. While the vessel 100 is illustrated in FIGS. 1 and 2 as having a single stenosis 108 and the description of the embodiments below is primarily made in the context of a single stenosis, it is nevertheless understood that the devices, systems, and methods described herein have similar application for a vessel having multiple stenosis regions.

Figure 3:
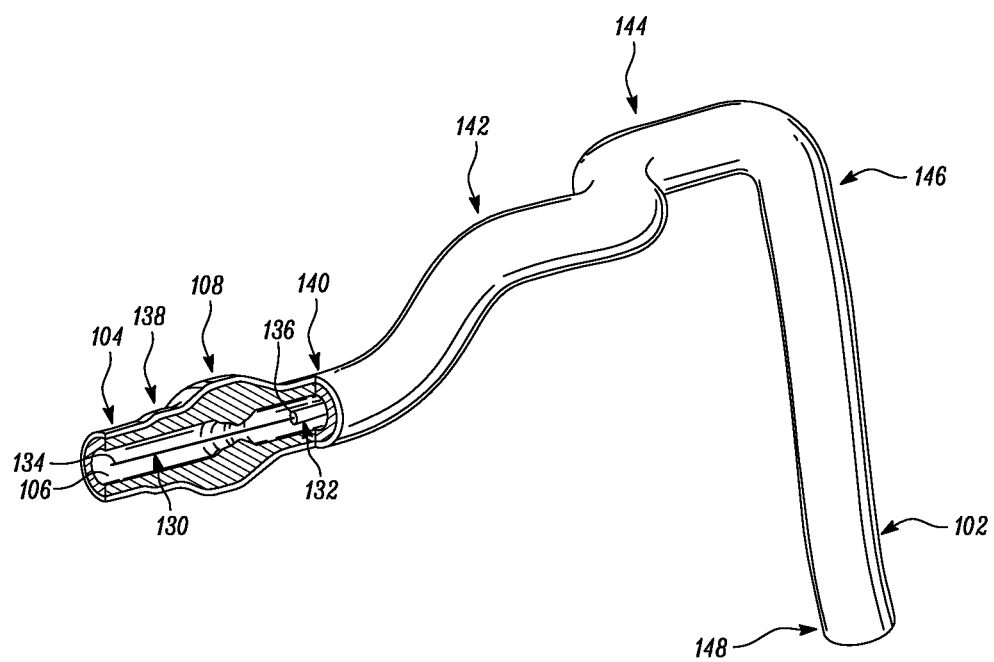
FIG. 3 is a partial cross-sectional perspective view of a portion of the vessel shown with instruments positioned therein according to aspects of the present disclosure.

FIG. 3 is a partial cross-sectional perspective view of a portion of the vessel 100 shown with instruments 130 and 132 positioned therein according to aspects of the present disclosure. In general, instruments 130 and 132 may be any form of device, instrument, or probe sized and shaped to be positioned within a vessel. In the illustrated embodiment, instrument 130 is generally representative of a guide wire, while instrument 132 is generally representative of a catheter. In that regard, instrument 130 extends through a central lumen of instrument 132. However, in other embodiments, the instruments 130 and 132 take other forms. In that regard, the instruments 130 and 132 are of similar form in some embodiments. For example, in some instances, both instruments 130 and 132 are guide wires. In other instances, both instruments 130 and 132 are catheters. On the other hand, the instruments 130 and 132 are of different form in some embodiments, such as the illustrated embodiment, where one of the instruments is a catheter and the other is a guide wire. Further, in some instances, the instruments 130 and 132 are disposed coaxial with one another, as shown in the illustrated embodiment of FIG. 3. In other instances, one of the instruments extends through an off-center lumen of the other instrument. In yet other instances, the instruments 130 and 132 extend side-by-side. In some particular embodiments, at least one of the instruments is as a rapid-exchange device, such as a rapid-exchange catheter. In such embodiments, the other instrument is a buddy wire or other device configured to facilitate the introduction and removal of the rapid-exchange device. Further still, in other instances, instead of two separate instruments 130 and 132 a single instrument is utilized. In some embodiments, the single instrument incorporates aspects of the functionalities (e.g., data acquisition) of both instruments 130 and 132.

Instrument 130 is configured to obtain diagnostic information about the vessel 100. In that regard, the instrument 130 includes one or more sensors, transducers, and/or other monitoring elements configured to obtain the diagnostic information about the vessel. The diagnostic information includes one or more of pressure, flow (velocity or volume), images (including images obtained using ultrasound (e.g., IVUS), optical coherence tomography (OCT), thermal, and/or other imaging techniques), temperature, and/or combinations thereof. The one or more sensors, transducers, and/or other monitoring elements are positioned adjacent a distal portion of the instrument 130 in some instances. In that regard, the one or more sensors, transducers, and/or other monitoring elements are positioned less than 30 cm, less than 10 cm, less than 5 cm, less than 3 cm, less than 2 cm, and/or less than 1 cm from a distal tip 134 of the instrument 130 in some instances. In some instances, at least one of the one or more sensors, transducers, and/or other monitoring elements is positioned at the distal tip of the instrument 130.

The instrument 130 includes at least one element configured to monitor pressure within the vessel 100. The pressure monitoring element can take the form a piezo-resistive pressure sensor, a piezo-electric pressure sensor, a capacitive pressure sensor, an electromagnetic pressure sensor, a fluid column (the fluid column being in communication with a fluid column sensor that is separate from the instrument and/or positioned at a portion of the instrument proximal of the fluid column), an optical pressure sensor, and/or combinations thereof. In some instances, one or more features of the pressure monitoring element are implemented as a solid-state component manufactured using semiconductor and/or other suitable manufacturing techniques. Examples of commercially available guide wire products that include suitable pressure monitoring elements include, without limitation, the PrimeWire PRESTIGE® pressure guide wire, the PrimeWire® pressure guide wire, and the ComboWire® XT pressure and flow guide wire, each available from Philips Volcano, as well as the PressureWire™ Certus guide wire and the PressureWire™ Aeris guide wire, each available from St. Jude Medical, Inc. Generally, the instrument 130 is sized such that it can be positioned through the stenosis 108 without significantly impacting fluid flow across the stenosis, which would impact the distal pressure reading. Accordingly, in some instances the instrument 130 has an outer diameter of 0.018" or less. In some embodiments, the instrument 130 has an outer diameter of 0.014" or less.

Instrument 132 is also configured to obtain diagnostic information about the vessel 100. In some instances, instrument 132 is configured to obtain the same diagnostic information as instrument 130. In other instances, instrument 132 is configured to obtain different diagnostic information than instrument 130, which may include additional diagnostic information, less diagnostic information, and/or alternative diagnostic information. The diagnostic information obtained by instrument 132 includes one or more of pressure, flow (velocity), images (including images obtained using ultrasound (e.g., IVUS), OCT, thermal, and/or other imaging techniques), temperature, and/or combinations thereof. Instrument 132 includes one or more sensors, transducers, and/or other monitoring elements configured to obtain this diagnostic information. In that regard, the one or more sensors, transducers, and/or other monitoring elements are positioned adjacent a distal portion of the instrument 132 in some instances. In that regard, the one or more sensors, transducers, and/or other monitoring elements are positioned less than 30 cm, less than 10 cm, less than 5 cm, less than 3 cm, less than 2 cm, and/or less than 1 cm from a distal tip 136 of the instrument 132 in some instances. In some instances, at least one of the one or more sensors, transducers, and/or other monitoring elements is positioned at the distal tip of the instrument 132.

Similar to instrument 130, instrument 132 also includes at least one element configured to monitor pressure within the vessel 100. The pressure monitoring element can take the form a piezo-resistive pressure sensor, a piezo-electric pressure sensor, a capacitive pressure sensor, an electromagnetic pressure sensor, a fluid column (the fluid column being in communication with a fluid column sensor that is separate from the instrument and/or positioned at a portion of the instrument proximal of the fluid column), an optical pressure sensor, and/or combinations thereof. In some instances, one or more features of the pressure monitoring element are implemented as a solid-state component manufactured using semiconductor and/or other suitable manufacturing techniques. Currently available catheter products suitable for use with one or more of Siemens AXIOM Sensis, Mennen Horizon XVu, and Philips Xper IM Physiomonitoring 5 and include pressure monitoring elements can be utilized for instrument 132 in some instances.

In accordance with aspects of the present disclosure, at least one of the instruments 130 and 132 is configured to monitor a pressure within the vessel 100 distal of the stenosis 108 and at least one of the instruments 130 and 132 is configured to monitor a pressure within the vessel proximal of the stenosis. In that regard, the instruments 130, 132 are sized and shaped to allow positioning of the at least one element configured to monitor pressure within the vessel 100 to be positioned proximal and/or distal of the stenosis 108 as necessary based on the configuration of the devices.

In that regard, FIG. 3 illustrates a position 138 suitable for measuring pressure distal of the stenosis 108. In that regard, the position 138 is less than 5 cm, less than 3 cm, less than 2 cm, less than 1 cm, less than 5 mm, and/or less than 2.5 mm from the distal end of the stenosis 108 (as shown in FIG. 2) in some instances. FIG. 3 also illustrates a plurality of suitable positions for measuring pressure proximal of the stenosis 108. In that regard, positions 140, 142, 144, 146, and 148 each represent a position that is suitable for monitoring the pressure proximal of the stenosis in some instances. In that regard, the positions 140, 142, 144, 146, and 148 are positioned at varying distances from the proximal end of the stenosis 108 ranging from more than 20 cm down to about 5 mm or less. Generally, the proximal pressure measurement will be spaced from the proximal end of the stenosis. Accordingly, in some instances, the proximal pressure measurement is taken at a distance equal to or greater than an inner diameter of the lumen of the vessel from the proximal end of the stenosis. In the context of coronary artery pressure measurements, the proximal pressure measurement is generally taken at a position proximal of the stenosis and distal of the aorta, within a proximal portion of the vessel. However, in some particular instances of coronary artery pressure measurements, the proximal pressure measurement is taken from a location inside the aorta. In other instances, the proximal pressure measurement is taken at the root or ostium of the coronary artery.

In some embodiments, at least one of the instruments 130 and 132 is configured to monitor pressure within the vessel 100 while being moved through the lumen 106. In some instances, instrument 130 is configured to be moved through the lumen 106 and across the stenosis 108. In that regard, the instrument 130 is positioned distal of the stenosis 108 and moved proximally (e.g., pulled back) across the stenosis to a position proximal of the stenosis in some instances. In other instances, the instrument 130 is positioned proximal of the stenosis 108 and moved distally across the stenosis to a position distal of the stenosis. Movement of the instrument 130, either proximally or distally, is controlled manually by medical personnel (e.g., hand of a surgeon) in some embodiments. In other embodiments, movement of the instrument 130, either proximally or distally, is controlled automatically by a movement control device (e.g., a pullback device, such as the Trak Back® II Device available from Philips Volcano). In that regard, the movement control device controls the movement of the instrument 130 at a selectable and known speed (e.g., 2.0 mm/s, 1.0 mm/s, 0.5 mm/s, 0.2 mm/s, etc.) in some instances. Movement of the instrument 130 through the vessel is continuous for each pullback or push through, in some instances. In other instances, the instrument 130 is moved step-wise through the vessel (e.g., repeatedly moved a fixed amount of distance and/or a fixed amount of time). Some aspects of the visual depictions discussed below are particularly suited for embodiments where at least one of the instruments 130 and 132 is moved through the lumen 106. Further, in some particular instances, aspects of the visual depictions discussed below are particularly suited for embodiments where a single instrument is moved through the lumen 106, with or without the presence of a second instrument.

In some instances, use of a single instrument has a benefit in that it avoids issues associated with variations in pressure measurements of one instrument relative to another over time, which is commonly referred to as drift. In that regard, a major source of drift in traditional Fractional Flow Reserve (FFR) measurements is divergence in the pressure reading of a guide wire relative to the pressure reading of a guide catheter. In that regard, because FFR is calculated as the ratio of the pressure measurement obtained by the guide wire to the pressure measurement obtained by the catheter, this divergence has an impact on the resulting FFR value. In contrast, where a single instrument is utilized to obtain pressure measurements as it is moved through the vessel, drift is negligible or non-existent. For example, in some instances, the single instrument is utilized to obtain relative changes in pressures as it is moved through the vessel such that the time period between pressure measurements is short enough to prevent any impact from any changes in pressure sensitivity of the instrument (e.g., less than 500 ms, less than 100 ms, less than 50 ms, less than 10 ms, less than 5 ms, less than 1 ms, or otherwise).

Figure 4:
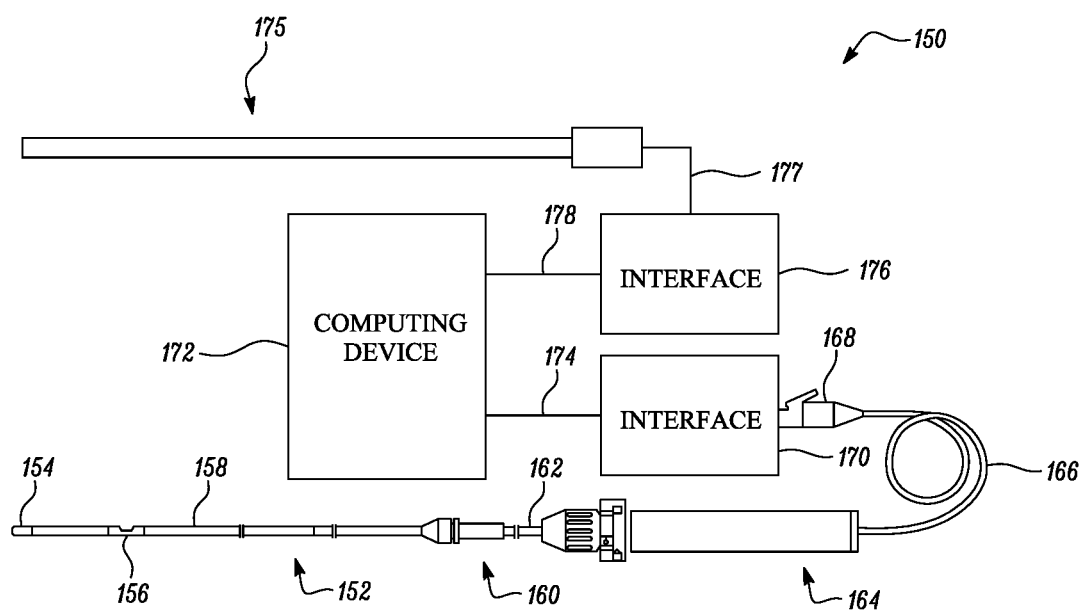
FIG. 4 is a schematic, diagrammatic view of a measurement system according to aspects of the present disclosure.

FIG. 4 is a schematic, diagrammatic view of a measurement system 150 according to aspects of the present disclosure. As shown, the system 150 includes an instrument 152. In that regard, in some instances instrument 152 is suitable for use as at least one of instruments 130 and 132 discussed above. Accordingly, in some instances the instrument 152 includes features similar to those discussed above with respect to instruments 130 and 132. In the illustrated embodiment, the instrument 152 is a guide wire having a distal portion 154 and a housing 156 positioned adjacent the distal portion. In that regard, the housing 156 is spaced approximately 3 cm from a distal tip of the instrument 152. The housing 156 is configured to house one or more sensors, transducers, and/or other monitoring elements configured to obtain the diagnostic information about the vessel. In the illustrated embodiment, the housing 156 contains at least a pressure sensor configured to monitor a pressure within a lumen in which the instrument 152 is positioned. A shaft 158 extends proximally from the housing 156. A torque device 160 is positioned over and coupled to a proximal portion of the shaft 158. A proximal end portion 162 of the instrument 152 is coupled to a connector 164. A cable 166 extends from connector 164 to a connector 168. In some instances, connector 168 is configured to be plugged into an interface 170. In that regard, interface 170 is a patient interface module (PIM) in some instances. In some instances, the cable 166 is replaced with a wireless connection. In that regard, it is understood that various communication pathways between the instrument 152 and the interface 170 may be utilized, including physical connections (including electrical, optical, and/or fluid connections), wireless connections, and/or combinations thereof.

The interface 170 is communicatively coupled to a computing device 172 via a connection 174. Computing device 172 is generally representative of any device suitable for performing the processing and analysis techniques discussed within the present disclosure. In some embodiments, the computing device 172 includes a processor, random access memory, and a storage medium. In that regard, in some particular instances the computing device 172 is programmed to execute steps associated with the data acquisition and analysis described herein. Accordingly, it is understood that any steps related to data acquisition, data processing, instrument control, and/or other processing or control aspects of the present disclosure may be implemented by the computing device using corresponding instructions stored on or in a non-transitory computer readable medium accessible by the computing device. In some instances, the computing device 172 is a console device. In some particular instances, the computing device 172 is similar to the s5™ Imaging System or the s5™ Imaging System, each available from Philips Volcano. In some instances, the computing device 172 is portable (e.g., handheld, on a rolling cart, etc.). Further, it is understood that in some instances the computing device 172 comprises a plurality of computing devices. In that regard, it is particularly understood that the different processing and/or control aspects of the present disclosure may be implemented separately or within predefined groupings using a plurality of computing devices. Any divisions and/or combinations of the processing and/or control aspects described below across multiple computing devices are within the scope of the present disclosure.

Together, connector 164, cable 166, connector 168, interface 170, and connection 174 facilitate communication between the one or more sensors, transducers, and/or other monitoring elements of the instrument 152 and the computing device 172. However, this communication pathway is exemplary in nature and should not be considered limiting in any way. In that regard, it is understood that any communication pathway between the instrument 152 and the computing device 172 may be utilized, including physical connections (including electrical, optical, and/or fluid connections), wireless connections, and/or combinations thereof. In that regard, it is understood that the connection 174 is wireless in some instances. In some instances, the connection 174 includes a communication link over a network (e.g., intranet, internet, telecommunications network, and/or other network). In that regard, it is understood that the computing device 172 is positioned remote from an operating area where the instrument 152 is being used in some instances. Having the connection 174 include a connection over a network can facilitate communication between the instrument 152 and the remote computing device 172 regardless of whether the computing device is in an adjacent room, an adjacent building, or in a different state/country. Further, it is understood that the communication pathway between the instrument 152 and the computing device 172 is a secure connection in some instances. Further still, it is understood that, in some instances, the data communicated over one or more portions of the communication pathway between the instrument 152 and the computing device 172 is encrypted.

The system 150 also includes an instrument 175. In that regard, in some instances instrument 175 is suitable for use as at least one of instruments 130 and 132 discussed above. Accordingly, in some instances the instrument 175 includes features similar to those discussed above with respect to instruments 130 and 132 in some instances. In the illustrated embodiment, the instrument 175 is a catheter-type device. In that regard, the instrument 175 includes one or more sensors, transducers, and/or other monitoring elements adjacent a distal portion of the instrument configured to obtain the diagnostic information about the vessel. In the illustrated embodiment, the instrument 175 includes a pressure sensor configured to monitor a pressure within a lumen in which the instrument 175 is positioned. The instrument 175 is in communication with an interface 176 via connection 177. In some instances, interface 176 is a hemodynamic monitoring system or other control device, such as Siemens AXIOM Sensis, Mennen Horizon XVu, and Philips Xper IM Physiomonitoring 5. In one particular embodiment, instrument 175 is a pressure-sensing catheter that includes fluid column extending along its length. In such an embodiment, interface 176 includes a hemostasis valve fluidly coupled to the fluid column of the catheter, a manifold fluidly coupled to the hemostasis valve, and tubing extending between the components as necessary to fluidly couple the components. In that regard, the fluid column of the catheter is in fluid communication with a pressure sensor via the valve, manifold, and tubing. In some instances, the pressure sensor is part of interface 176. In other instances, the pressure sensor is a separate component positioned between the instrument 175 and the interface 176. The interface 176 is communicatively coupled to the computing device 172 via a connection 178.

Similar to the connections between instrument 152 and the computing device 172, interface 176 and connections 177 and 178 facilitate communication between the one or more sensors, transducers, and/or other monitoring elements of the instrument 175 and the computing device 172. However, this communication pathway is exemplary in nature and should not be considered limiting in any way. In that regard, it is understood that any communication pathway between the instrument 175 and the computing device 172 may be utilized, including physical connections (including electrical, optical, and/or fluid connections), wireless connections, and/or combinations thereof. In that regard, it is understood that the connection 178 is wireless in some instances. In some instances, the connection 178 includes a communication link over a network (e.g., intranet, internet, telecommunications network, and/or other network). In that regard, it is understood that the computing device 172 is positioned remote from an operating area where the instrument 175 is being used in some instances. Having the connection 178 include a connection over a network can facilitate communication between the instrument 175 and the remote computing device 172 regardless of whether the computing device is in an adjacent room, an adjacent building, or in a different state/country. Further, it is understood that the communication pathway between the instrument 175 and the computing device 172 is a secure connection in some instances. Further still, it is understood that, in some instances, the data communicated over one or more portions of the communication pathway between the instrument 175 and the computing device 172 is encrypted.

It is understood that one or more components of the system 150 are not included, are implemented in a different arrangement/order, and/or are replaced with an alternative device/mechanism in other embodiments of the present disclosure. For example, in some instances, the system 150 does not include interface 170 and/or interface 176. In such instances, the connector 168 (or other similar connector in communication with instrument 152 or instrument 175) may plug into a port associated with computing device 172. Alternatively, the instruments 152, 175 may communicate wirelessly with the computing device 172. Generally speaking, the communication pathway between either or both of the instruments 152, 175 and the computing device 172 may have no intermediate nodes (i.e., a direct connection), one intermediate node between the instrument and the computing device, or a plurality of intermediate nodes between the instrument and the computing device.

Figure 5:
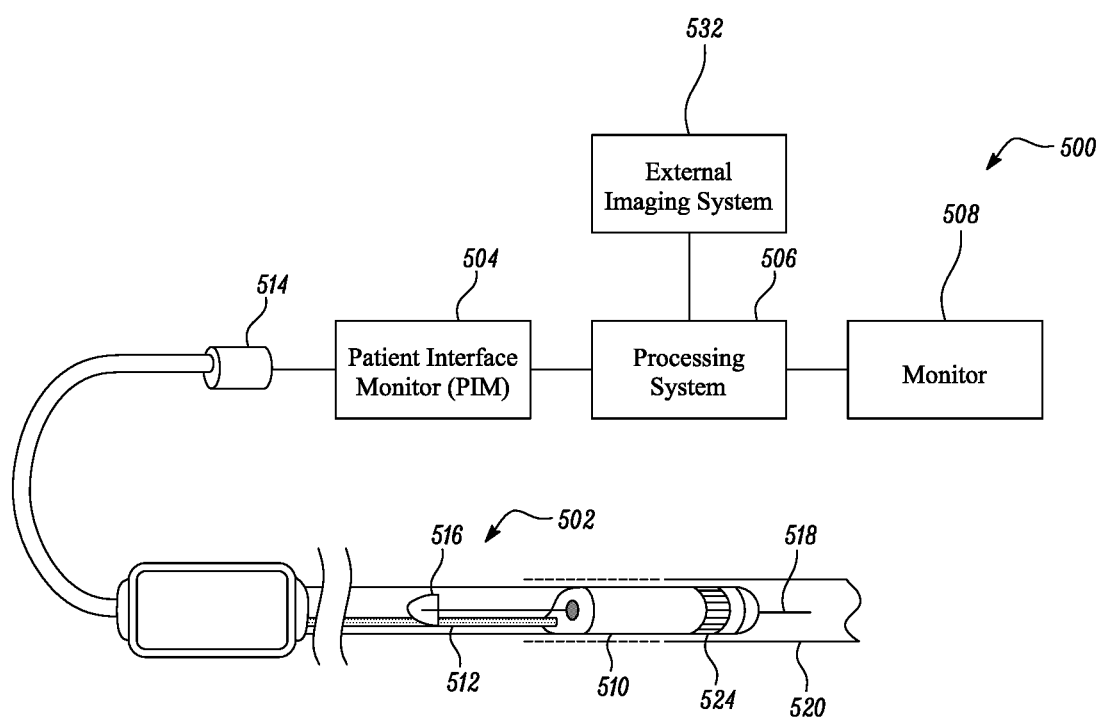
FIG. 5 is a diagrammatic schematic view of an intraluminal imaging system, according to aspects of the present disclosure.

FIG. 5 is a diagrammatic schematic view of an intraluminal imaging system incorporating the intravascular co-registration system, according to aspects of the present disclosure. The intraluminal imaging system 500 can be an intravascular ultrasound (IVUS) imaging system in some embodiments. The intraluminal imaging system 500 may include an intraluminal device 502, a patient interface module (PIM) 504, a console or processing system 506, a monitor 508, and an external imaging system 532 which may include angiography, ultrasound, X-ray, computed tomography (CT), magnetic resonance imaging (MRI), or other imaging technologies, equipment, and methods. The intraluminal device 502 is sized and shaped, and/or otherwise structurally arranged to be positioned within a body lumen of a patient. For example, the intraluminal device 502 can be a catheter, guide wire, guide catheter, pressure wire, and/or flow wire in various embodiments. In some circumstances, the system 500 may include additional elements and/or may be implemented without one or more of the elements illustrated in FIG. 1. For example, the system 500 may omit the external imaging system 532.

The intraluminal imaging system 500 (or intravascular imaging system) can be any type of imaging system suitable for use in the lumens or vasculature of a patient. In some embodiments, the intraluminal imaging system 500 is an intraluminal ultrasound (IVUS) imaging system. In other embodiments, the intraluminal imaging system 500 may include systems configured for forward looking intraluminal ultrasound (FL-IVUS) imaging, intraluminal photoacoustic (IVPA) imaging, intracardiac echocardiography (ICE), transesophageal echocardiography (TEE), and/or other suitable imaging modalities.

It is understood that the system 500 and/or device 502 can be configured to obtain any suitable intraluminal imaging data. In some embodiments, the device 502 may include an imaging component of any suitable imaging modality, such as optical imaging, optical coherence tomography (OCT), etc. In some embodiments, the device 502 may include any suitable non-imaging component, including a pressure sensor, a flow sensor, a temperature sensor, an optical fiber, a reflector, a mirror, a prism, an ablation element, a radio frequency (RF) electrode, a conductor, or combinations thereof. Generally, the device 502 can include an imaging element to obtain intraluminal imaging data associated with the lumen 520. The device 502 may be sized and shaped (and/or configured) for insertion into a vessel or lumen 520 of the patient.

The system 500 may be deployed in a catheterization laboratory having a control room. The processing system 506 may be located in the control room. Optionally, the processing system 506 may be located elsewhere, such as in the catheterization laboratory itself. The catheterization laboratory may include a sterile field while its associated control room may or may not be sterile depending on the procedure to be performed and/or on the health care facility. The catheterization laboratory and control room may be used to perform any number of medical imaging procedures such as angiography, fluoroscopy, CT, IVUS, virtual histology (VH), forward looking IVUS (FL-IVUS), intraluminal photoacoustic (IVPA) imaging, a fractional flow reserve (FFR) determination, a coronary flow reserve (CFR) determination, optical coherence tomography (OCT), computed tomography, intracardiac echocardiography (ICE), forward-looking ICE (FLICE), intraluminal palpography, transesophageal ultrasound, fluoroscopy, and other medical imaging modalities, or combinations thereof. In some embodiments, device 502 may be controlled from a remote location such as the control room, such than an operator is not required to be in close proximity to the patient.

The intraluminal device 502, PIM 504, monitor 508, and external imaging system 532 may be communicatively coupled directly or indirectly to the processing system 506. These elements may be communicatively coupled to the medical processing system 506 via a wired connection such as a standard copper link or a fiber optic link and/or via wireless connections using IEEE 802.11 Wi-Fi standards, Ultra Wide-Band (UWB) standards, wireless FireWire, wireless USB, or another high-speed wireless networking standard. The processing system 506 may be communicatively coupled to one or more data networks, e.g., a TCP/IP-based local area network (LAN). In other embodiments, different protocols may be utilized such as Synchronous Optical Networking (SONET). In some cases, the processing system 506 may be communicatively coupled to a wide area network (WAN). The processing system 506 may utilize network connectivity to access various resources. For example, the processing system 506 may communicate with a Digital Imaging and Communications in Medicine (DICOM) system, a Picture Archiving and Communication System (PACS), and/or a Hospital Information System (HIS) via a network connection.

At a high level, an ultrasound imaging intraluminal device 502 emits ultrasonic energy from a transducer array 524 included in scanner assembly 510 mounted near a distal end of the intraluminal device 502. The ultrasonic energy is reflected by tissue structures in the medium (such as a lumen 520) surrounding the scanner assembly 510, and the ultrasound echo signals are received by the transducer array 524. The scanner assembly 510 generates electrical signal(s) representative of the ultrasound echoes. The scanner assembly 510 can include one or more single ultrasound transducers and/or a transducer array 524 in any suitable configuration, such as a planar array, a curved array, a circumferential array, an annular array, etc. For example, the scanner assembly 510 can be a one-dimensional array or a two-dimensional array in some instances. In some instances, the scanner assembly 510 can be a rotational ultrasound device. The active area of the scanner assembly 510 can include one or more transducer materials and/or one or more segments of ultrasound elements (e.g., one or more rows, one or more columns, and/or one or more orientations) that can be uniformly or independently controlled and activated. The active area of the scanner assembly 510 can be patterned or structured in various basic or complex geometries. The scanner assembly 510 can be disposed in a side-looking orientation (e.g., ultrasonic energy emitted perpendicular and/or orthogonal to the longitudinal axis of the intraluminal device 502) and/or a forward-looking looking orientation (e.g., ultrasonic energy emitted parallel to and/or along the longitudinal axis). In some instances, the scanner assembly 510 is structurally arranged to emit and/or receive ultrasonic energy at an oblique angle relative to the longitudinal axis, in a proximal or distal direction. In some embodiments, ultrasonic energy emission can be electronically steered by selective triggering of one or more transducer elements of the scanner assembly 510.

The ultrasound transducer(s) of the scanner assembly 510 can be a piezoelectric micromachined ultrasound transducer (PMUT), capacitive micromachined ultrasonic transducer (CMUT), single crystal, lead zirconate titanate (PZT), PZT composite, other suitable transducer type, and/or combinations thereof. In an embodiment the ultrasound transducer array 524 can include any suitable number of individual transducer elements or acoustic elements between 1 acoustic element and 1000 acoustic elements, including values such as 2 acoustic elements, 4 acoustic elements, 36 acoustic elements, 64 acoustic elements, 128 acoustic elements, 500 acoustic elements, 812 acoustic elements, and/or other values both larger and smaller.

The PIM 504 transfers the received echo signals to the processing system 506 where the ultrasound image (including the flow information) is reconstructed and displayed on the monitor 508. The console or processing system 506 can include a processor and a memory. The processing system 506 may be operable to facilitate the features of the intraluminal imaging system 500 described herein. For example, the processor can execute computer readable instructions stored on the non-transitory tangible computer readable medium.

The PIM 504 facilitates communication of signals between the processing system 506 and the scanner assembly 510 included in the intraluminal device 502. This communication may include providing commands to integrated circuit controller chip(s) within the intraluminal device 502, selecting particular element(s) on the transducer array 524 to be used for transmit and receive, providing the transmit trigger signals to the integrated circuit controller chip(s) to activate the transmitter circuitry to generate an electrical pulse to excite the selected transducer array element(s), and/or accepting amplified echo signals received from the selected transducer array element(s) via amplifiers included on the integrated circuit controller chip(s). In some embodiments, the PIM 504 performs preliminary processing of the echo data prior to relaying the data to the processing system 506. In examples of such embodiments, the PIM 504 performs amplification, filtering, and/or aggregating of the data. In an embodiment, the PIM 504 also supplies high- and low-voltage DC power to support operation of the intraluminal device 502 including circuitry within the scanner assembly 510.

The processing system 506 receives echo data from the scanner assembly 510 by way of the PIM 504 and processes the data to reconstruct an image of the tissue structures in the medium surrounding the scanner assembly 510. Generally, the device 502 can be utilized within any suitable anatomy and/or body lumen of the patient. The processing system 506 outputs image data such that an image of the vessel or lumen 520, such as a cross-sectional IVUS image of the lumen 520, is displayed on the monitor 508. Lumen 520 may represent fluid filled or fluid-surrounded structures, both natural and man-made. Lumen 520 may be within a body of a patient. Lumen 520 may be a blood vessel, such as an artery or a vein of a patient's vascular system, including cardiac vasculature, peripheral vasculature, neural vasculature, renal vasculature, and/or or any other suitable lumen inside the body. For example, the device 502 may be used to examine any number of anatomical locations and tissue types, including without limitation, organs including the liver, heart, kidneys, gall bladder, pancreas, lungs; ducts; intestines; nervous system structures including the brain, dural sac, spinal cord and peripheral nerves; the urinary tract; as well as valves within the blood, chambers or other parts of the heart, and/or other systems of the body. In addition to natural structures, the device 502 may be used to examine man-made structures such as, but without limitation, heart valves, stents, shunts, filters and other devices.

The controller or processing system 506 may include a processing circuit having one or more processors in communication with memory and/or other suitable tangible computer readable storage media. The controller or processing system 506 may be configured to carry out one or more aspects of the present disclosure. In some embodiments, the processing system 506 and the monitor 508 are separate components. In other embodiments, the processing system 506 and the monitor 508 are integrated in a single component. For example, the system 500 can include a touch screen device, including a housing having a touch screen display and a processor. The system 500 can include any suitable input device, such as a touch sensitive pad or touch screen display, keyboard/mouse, joystick, button, etc., for a user to select options shown on the monitor 508. The processing system 506, the monitor 508, the input device, and/or combinations thereof can be referenced as a controller of the system 500. The controller can be in communication with the device 502, the PIM 504, the processing system 506, the monitor 508, the input device, and/or other components of the system 500.

In some embodiments, the intraluminal device 502 includes some features similar to traditional solid-state IVUS catheters, such as the EagleEye® catheter available from Philips Volcano and those disclosed in U.S. Pat. No. 7,846,101 hereby incorporated by reference in its entirety. For example, the intraluminal device 502 may include the scanner assembly 510 near a distal end of the intraluminal device 502 and a transmission line bundle 512 extending along the longitudinal body of the intraluminal device 502. The cable or transmission line bundle 512 can include a plurality of conductors, including one, two, three, four, five, six, seven, or more conductors.

The transmission line bundle 512 terminates in a PIM connector 514 at a proximal end of the intraluminal device 502. The PIM connector 514 electrically couples the transmission line bundle 512 to the PIM 504 and physically couples the intraluminal device 502 to the PIM 504. In an embodiment, the intraluminal device 502 further includes a guidewire exit port 516. Accordingly, in some instances the intraluminal device 502 is a rapid-exchange catheter. The guidewire exit port 516 allows a guidewire 518 to be inserted towards the distal end in order to direct the intraluminal device 502 through the lumen 520.

The monitor 508 may be a display device such as a computer monitor or other type of screen. The monitor 508 may be used to display selectable prompts, instructions, and visualizations of imaging data to a user. In some embodiments, the monitor 508 may be used to provide a procedure-specific workflow to a user to complete an intraluminal imaging procedure. This workflow may include performing a pre-stent plan to determine the state of a lumen and potential for a stent, as well as a post-stent inspection to determine the status of a stent that has been positioned in a lumen. The workflow may be presented to a user as any of a variety of different the displays or visualizations (as shown for example in FIGS. 4 and 5).

The external imaging system 532 can be configured to obtain x-ray, radiographic, angiographic (e.g., individual, higher-dose images with contrast dye), and/or fluoroscopic (e.g., real-time, low-dose X-ray images without contrast) images of the body of a patient (including the vessel 520). External imaging system 532 may also be configured to obtain computed tomography images of the body of patient (including the vessel 520). The external imaging system 532 may include an external ultrasound probe configured to obtain ultrasound images of the body of the patient (including the vessel 520) while positioned outside the body. In some embodiments, the system 500 includes other imaging modality systems (e.g., MRI) to obtain images of the body of the patient (including the vessel 520). The processing system 506 can utilize the images of the body of the patient in conjunction with the intraluminal images obtained by the intraluminal device 502.

Figure 6:
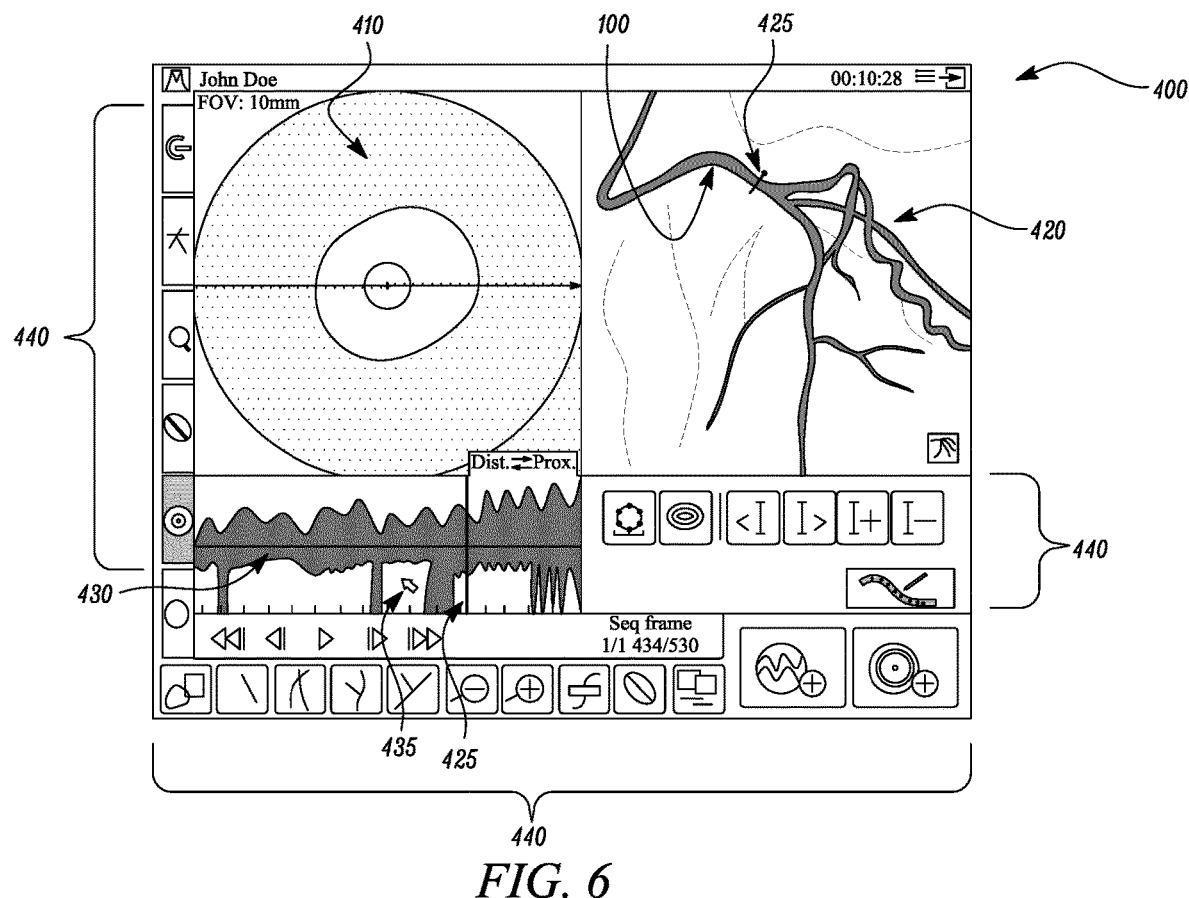
FIG. 6 shows an example screen display of an intraluminal imaging system in accordance with aspects of the present disclosure.

FIG. 6 shows an example screen display 400 of an intraluminal imaging system 500 in accordance with aspects of the present disclosure. The screen display 400 includes a tomographic intravascular image 410 (e.g., an IVUS image) of a vessel 100, an externally acquired roadmap image 420 (e.g., an x-ray angiographic or venographic image) of the same vessel 100, and an image longitudinal display (ILD) 430, which comprises longitudinal cross sections of a plurality of tomographic intravascular images 410. The intravascular image 410 can be a radial or axial cross-section of the vessel 100, perpendicular a longitudinal axis of the vessel 100. In this example, the roadmap image 420 and ILD 430 each include a position marker 425 showing the current (co-registered) position of the intraluminal probe 502 (and hence of the tomographic image 410) within the vessel 100. The ILD 430 also includes a region-of-interest marker 435 that may, for example, identify the location of a diseased or compressed section of the vessel 100. Co-registration of the intraluminal images 410 with the roadmap image 420 permits a clinician or other user to see, at a glance, precisely where in the vessel 100 the intraluminal imaging probe 502 is currently imaging. This position certainty may be associated with improved clinical outcomes.

To co-register images and data into the roadmap image 420, the processor circuit identifies a path of the vessel 100 in the roadmap image 420 (e.g., based on segmentation, either of the combined roadmap image or the individual angiographic frames). The processor circuit also identifies a path of the intravascular device movement based on the fluoroscopic image stream. Co-registration includes matching the paths of the pre-pullback angiographic images and the mid-pullback fluoroscopic images. During the fluoroscopic image stream (e.g., during live x-ray tracking of the intraluminal probe while it is pulled back through the vessel), the processor circuit tracks the position along the movement path and the corresponding intravascular data obtained at that position. Matching the movement path from the fluoroscopic images to the vessel path in the angiographic images allows for the intravascular data vs. position data to be associated with the roadmap image. Aspects of co-registration are described, for example, in U.S. Pat. Nos. 7,930,014 and 8,298,147, the entireties of which are hereby incorporated by reference in its eternity. In some embodiments, co-registration may occur live, during the pullback procedure itself. In other embodiments, co-registration may occur during a review mode, after the pullback procedure is complete.

Also visible in this example are a plurality of user interface controls 440.

Figure 7:
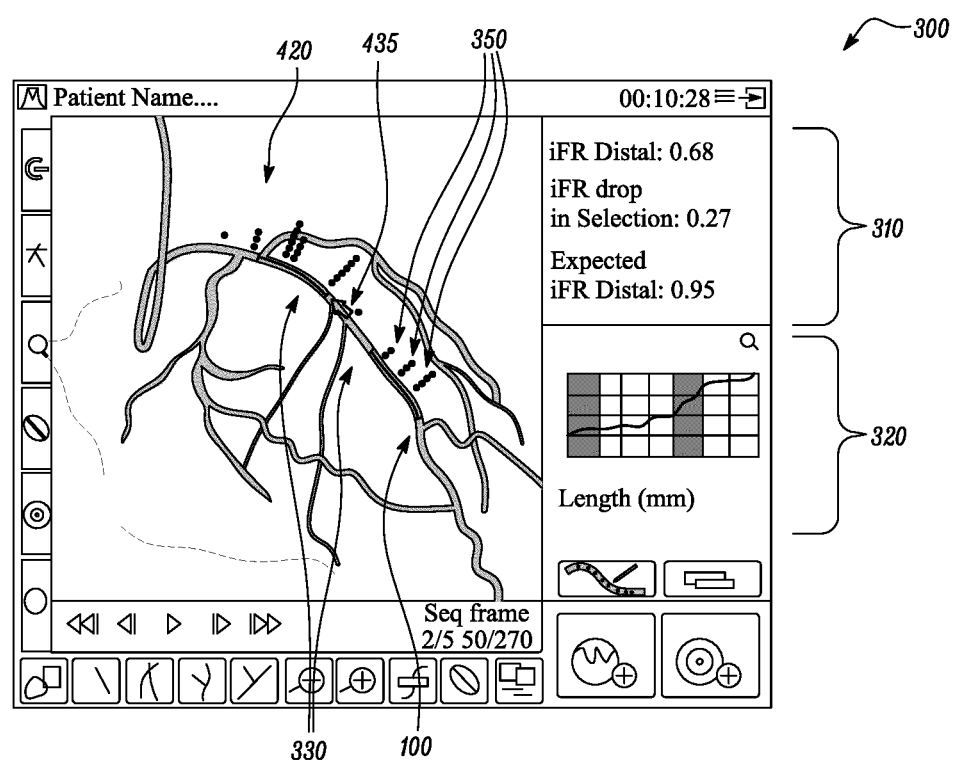
FIG. 7 shows an example screen display of an intraluminal data gathering system in accordance with aspects of the present disclosure.

FIG. 7 shows an example screen display 300 of an intraluminal data gathering system 500 in accordance with aspects of the present disclosure. The screen display 300 includes a roadmap image 420 of a vessel 100 as well as numerical physiological measurements 310 and graphical physiological measurements 320 from the same vessel 100. In this example, stylized or iconized physiological measurements have also been overlaid (e.g., co-registered) onto the image of the vessel 100 in the roadmap image 420 at the locations within the vessel 100 where they were taken. For example, stacked dots or numerals 350 adjacent to a location along the vessel can be indicative of a pressure-related value at that location, although diverse other representations may be employed instead or in addition. For example, in the illustrated embodiment, each dot can be representative of a given change in the pressure ratio. Exemplary graphical representations associated with pressure data are described in U.S. Pat. No. 10,226,189, the entirety of which is incorporated by reference herein. Co-registration of the intraluminal physiological measurements 330 with the roadmap image 420 permits a clinician or other user to see, at a glance, precisely where in the vessel 100 the measurements 330 were taken. This position certainty may be associated with improved clinical outcomes.

Figure 8:
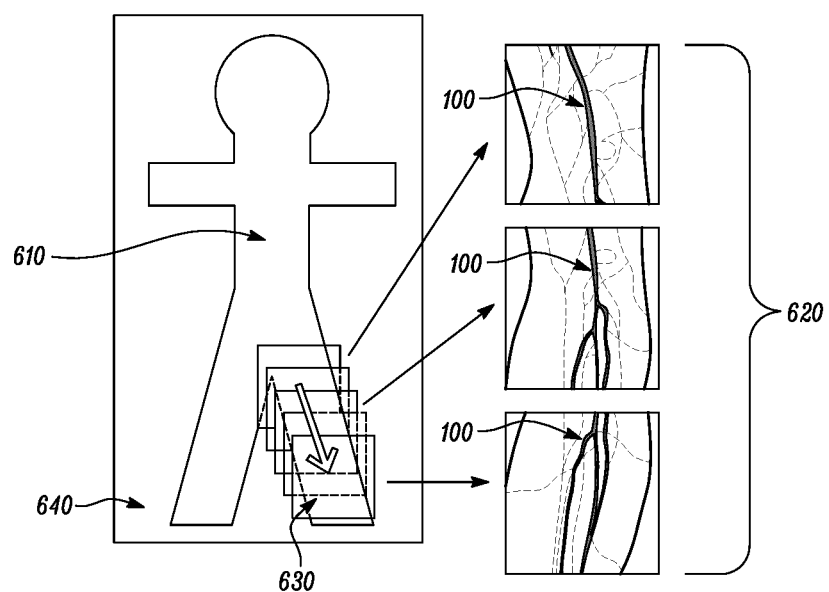
FIG. 8 shows multiple overlapping, externally acquired images being taken of a peripheral vessel within a patient in accordance with aspects of the present disclosure.

FIG. 8 shows multiple overlapping, externally acquired images 620 being taken of a peripheral vessel 100 within a patient 610 with a movable external imaging sensor 630 in accordance with aspects of the present disclosure. In an example, the movable external imaging sensor 630 is a component of the external imaging system 532 shown in FIG. 5.

In peripheral vasculature catheterization procedures, due to the length of peripheral vessels (e.g., arm and leg vessels) it is sometimes necessary to visualize the blood vessel(s) of interest through multiple images, e.g., by moving the x-ray sensor along the anatomy while the images are being captured. This may require two or more images, and in some instances may require three or more, four or more, or five or more images. Unfortunately, this means there is no single frame (e.g., a contrast-filled x-ray frame or angiography frame) that can serve as the 'roadmap' for the co-registration. The roadmap image must fit into a single frame on the display to give the user the ability to navigate to any location in the blood vessel by clicking and dragging on the roadmap. Furthermore, tracking the intravascular device while it's being pulled through a blood vessel in a potentially-moving low-dose x-ray image stream and mapping its position to a stationary roadmap image can be difficult without a single roadmap image.

In an example, the position and/or orientation of the movable external imaging sensor 630 is tracked as the external imaging sensor 630 is moved translationally along the length of the segment of interest of the vessel 100, approximately parallel to the vessel 100, and each captured image has associated with it a transformation matrix containing information about the position and/or orientation of the sensor 630 at the time the image was captured. In an example, the orientation of the external imaging sensor 630 is held constant, or nearly constant, while the external imaging sensor 630 is moved along the length of the lumen segment of interest. In other embodiments, the sensor 630 is held stationary and the table 640 on which the patient 610 is lying is instead translated, such that the lumen is imaged along its length. In this case, the transformation matrix contains information about the orientation of the sensor 630 and the position of the table. In some embodiments, the transformation matrix may also include information about the zoom level or field of view of the external imaging system 532 at the time each image 620 was captured. In some embodiments, the algorithm also automatically segments the vessel 100, e.g., by identifying which pixels in the roadmap image are part of the vessel 100, and which are part of the surrounding tissue or empty space. Depending on the implementation, such segmentation may or may not be necessary for accurate stitching.

Figure 9:
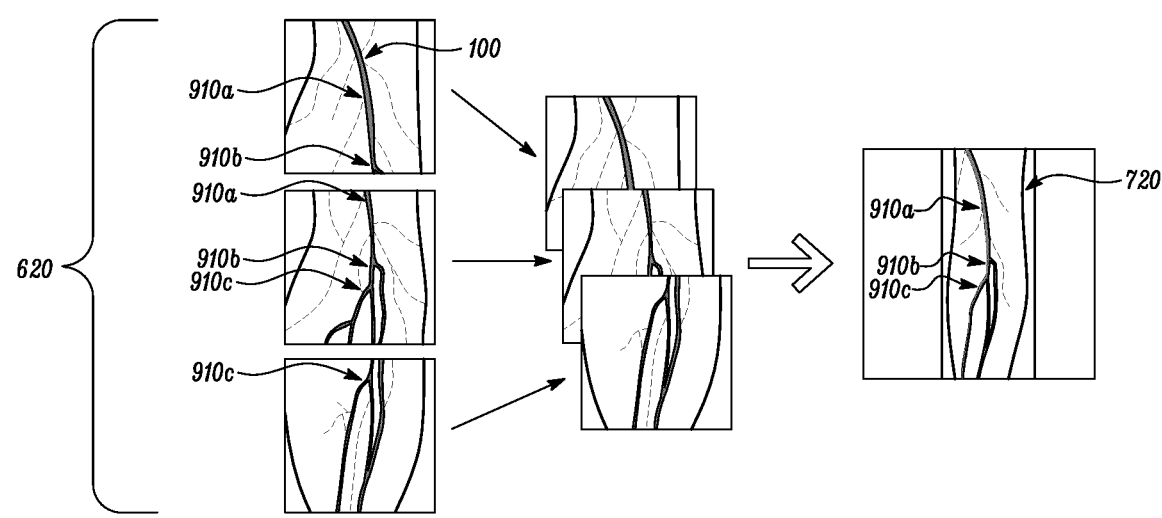
FIG. 9 shows multiple externally acquired images of a peripheral vessel being stitched together into a single image that includes all the features of the separate images.

FIG. 9 shows multiple (in this example, three) externally acquired images 620 of a peripheral vessel 100 being stitched together into a single image 720 that includes all the features of the separate images 620. This stitched-together composite image is now suitable for use as a roadmap image 420, as it covers the entire length of the vessel segment of interest. In some embodiments, each image has associated with it a transformation matrix that encodes the position and/or orientation of the external imaging sensor 630 at the time the image was captured, and an initial coarse geometric stitching step involves simply constructing a roadmap image 720 containing each component image 620 at a location matching a 2D projection of its known 3D position and/or orientation, and each new image 620 added to the roadmap image 720 may simply overwrite co-located portions of earlier-added images 620.

In some embodiments, a second, finer image stitching step is executed using image recognition and image stitching techniques. Such algorithms may rely on recognition and matching of anatomical landmarks (e.g., vessel branches or intersections) from one image to the next. For example, as shown in FIG. 9, landmark 910*a* and landmark 910*b* each appear in two of three images, and landmark 910*b* and 910*c* each appear in two of three images. These locations can be used to register and align the three images into a single image or coordinate system. Algorithms for stitching together multiple images include the random sample consensus method (RANSAC), and may include for example the steps of keypoint or landmark detection, keypoint or landmark registration, image calibration, image alignment, compositing, motion compensation, de-ghosting, color blending, and seam line elimination. On processing systems 506 typical of intraluminal imaging or data collection systems 500 as shown in FIG. 5, such algorithms can be run in near-real time, and may be capable on some systems of running in real time. In other embodiments, geometric stitching is used exclusively, without an additional image stitching step. In still other embodiments, image stitching is used exclusively, without a previous geometric stitching step. However, in either case, the positions of each pixel in the roadmap image 720 are known, and can be expressed for example in a patient-centric or table-centric coordinate system.

In an example, from a plurality of frames 620 captured by the external imaging system 532, a smaller number of frames 620 are selected for stitching. The number of selected frames may be two, three, four, five, or more frames. The selected frames 620 must have enough overlap for the landmark identification algorithm to be able to match any given landmark between at least two images. If there is enough overlap to register landmarks between images, but overlap is otherwise minimized, then this decreases the number of images required to be stitched, in order to cover the full length of the vessel segment of interest, and therefore the time, memory, and computation power required by the algorithm. Minimizing overlap also increases the amount of additional information added to the roadmap by each frame. Furthermore, heartbeat and respiration can create periodic variations in blood flow within the vessel 100, and thus variations in the amount of contrast agent filling the vessel, so the algorithm selects those frames in which the vessel is most filled with contrast agent and therefore most visible. In an example, the processor circuit can perform segmentation to identify the lumen contour and perform pixel-analysis to identify the image frame with the most bright or dark pixels (representative of the contrast agent). In an example, the algorithm selects 2, 3, 4, 5, or more frames that fully cover the length of the vessel segment of interest, and that have adequate contrast and adequate overlap for the stitching to be performed accurately.

Figure 10A:
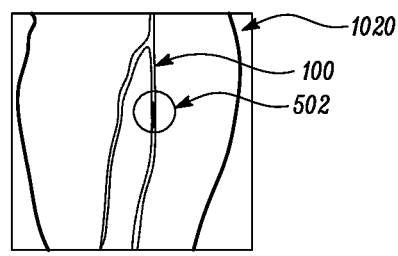
FIGS. 10a, 10b, and 10c show a sequence of fluoroscopic X-ray images showing the location of radiopaque markings on an intraluminal probe within a vessel, during three different stages of a pullback procedure, in accordance with at least one embodiment of the present disclosure.
Figure 10B:
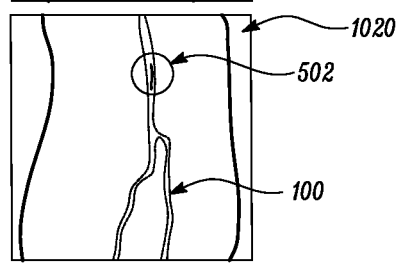
Figure 10C:
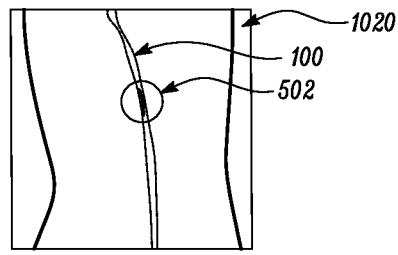

FIGS. 10*a*, 10*b*, and 10*c* show a sequence of fluoroscopic X-ray images 1020 showing the location of radiopaque markings on an intraluminal imaging probe or intraluminal sensing probe 502 within a vessel 100, during three different stages of a pullback procedure (e.g., moving progressively higher up the leg, toward the pelvis), in accordance with at least one embodiment of the present disclosure. The vessel 100 is shown as a dotted line, because in real-time fluoroscopic imaging, contrast agent is typically not used within the vessel 100, and the vessel walls and lumen are themselves transparent to x-rays and therefore not visible on the fluoroscopic image. Tracking the probe or device 502 in a low-dose fluoroscopy image stream (e.g., a live, moving x-ray stream), and mapping its position to the stitched-together roadmap, involve knowledge of the position and/or orientation of the x-ray sensor 630 at each moment in time (or each moment when an image is captured), as well as automatic detection and identification of radiopaque markers on the probe 502, such that the position of the probe 502 in a 2D projection of 3D space may be determined via a transformation matrix (e.g., transformation into body-centric or table-centric coordinates). Since the position and/or orientation of the x-ray sensor 630 was also known when each of the component images 620 of the stitched-together roadmap image 720 were captured, the position of the intraluminal probe 502 in the can be mapped into the same coordinate system as the positions of physical landmarks in the anatomy that are shown in the roadmap image, such that the position of the probe 502 can be accurately indicated on the roadmap image 402 with a probe position indicator 425. In an example, the algorithm also automatically segments the vessel 100, e.g., by identifying which pixels in the roadmap image are part of the vessel 100, and which are part of the surrounding tissue or empty space, such that the probe position can be accurately co-registered only into locations that are known to be part of the vessel 100. Depending on the implementation, segmentation may be as simple as detecting the brightness of each pixel, such that pixels darker than a threshold brightness level are identified as contrast agent and therefore part of the vessel 100, whereas pixels that are brighter than a threshold amount are identified as tissue, or as empty space.

A coordinate system transformation can be implemented so that one or more images of the fluoroscopic image stream are the same coordinate system as the one or more angiographic images and/or the roadmap image.

In an example, the movable external imaging sensor (e.g., x-ray sensor) 630 holds a fixed orientation during the pullback, and translates along the reverse vector followed by the sensor 630 during roadmap image acquisition, at the same approximate speed as the speed of the intraluminal imaging probe 502 through the vessel 100. Co-registration of the intraluminal probe position indicator 425 with the roadmap image 420 permits a clinician or other user to see, at a glance, precisely where in the vessel 100 the intraluminal probe 502 is positioned. This position certainty may be associated with improved clinical outcomes.

Examples of border detection, image processing, image analysis, and/or pattern recognition include U.S. Pat. No. 6,200,268 entitled "VASCULAR PLAQUE CHARACTERIZATION" issued Mar. 13, 2001 with D. Geoffrey Vince, Barry D. Kuban and Anuja Nair as inventors, U.S. Pat. No. 6,381,350 entitled "INTRAVASCULAR ULTRASONIC ANALYSIS USING ACTIVE CONTOUR METHOD AND SYS IEM" issued Apr. 30, 2002 with Jon D. Klingensmith, D. Geoffrey Vince and Raj Shekhar as inventors, U.S. Pat. No. 7,074,188 entitled "SYSTEM AND METHOD OF CHARACTERIZING VASCULAR TISSUE" issued Jul. 11, 2006 with Anuja Nair, D. Geoffrey Vince, Jon D. Klingensmith and Barry D. Kuban as inventors, U.S. Pat. No. 7,175,597 entitled "NON-INVASIVE TISSUE CHARACTERIZATION SYSTEM AND METHOD" issued Feb. 13, 2007 with D. Geoffrey Vince, Anuja Nair and Jon D. Klingensmith as inventors, U.S. Pat. No. 7,215,802 entitled "SYSTEM AND METHOD FOR VASCULAR BORDER DETECTION" issued May 8, 2007 with Jon D. Klingensmith, Anuja Nair, Barry D. Kuban and D. Geoffrey Vince as inventors, U.S. Pat. No. 7,359,554 entitled "SYSTEM AND METHOD FOR IDENTIFYING A VASCULAR BORDER" issued Apr. 15, 2008 with Jon D. Klingensmith, D. Geoffrey Vince, Anuja Nair and Barry D. Kuban as inventors and U.S. Pat. No. 7,463,759 entitled "SYSTEM AND METHOD FOR VASCULAR BORDER DETECTION" issued Dec. 9, 2008 with Jon D. Klingensmith, Anuja Nair, Barry D. Kuban and D. Geoffrey Vince, as inventors, the teachings of which are hereby incorporated by reference herein in their entirety.

Figure 11:
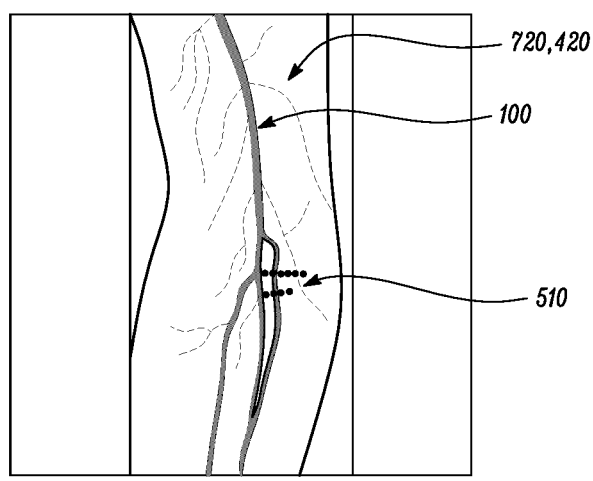
FIG. 11 shows a stitched-together composite image that serves as a roadmap image of a peripheral vessel in the leg of a patient, in accordance with at least one embodiment of the present disclosure.

FIG. 11 shows a stitched-together composite image 720 that serves as a roadmap image 420 of a peripheral vessel 100 in the leg of a patient 610, in accordance with at least one embodiment of the present disclosure. A graphical representation of the co-registered intravascular data is shown at the corresponding locations along a length of the vessel in the roadmap image. All or a part of the graphical representation can be provided adjacent to, alongside, over, across, transverse to, and/or otherwise proximate to the vessel in the roadmap image. In some embodiments, all or a part of the graphical representation is spaced from the vessel in the roadmap image. In some embodiments, the graphical representation can be a numerical value, text, alphanumeric characters, a shape, a symbol, an image, and/or combinations thereof. Any suitable shape/or symbol can be used, such as a circle, dot, square, diamond, line segment, etc.). In some embodiments, the graphical representation is an indicator that identifies that co-registered intravascular data was obtained that the particular location. In some embodiments, the graphical representation is itself representative of the content of the intravascular data. For example, the graphical representation can visually depict the value of a pressure ratio or a change in the pressure ratio, and/or the graphical representation can be an IVUS image corresponding to the location along the vessel. In embodiments in which multiple types of intravascular data are obtained, different graphical representations corresponding to the different types of intravascular data are provided along the vessel in the roadmap image.

In the example of FIG. 11, stylized or iconized physiological data 511 has been co-registered on the roadmap image 420 at the locations where the measurements were taken. In an example, each shape can be representative of an amount of change in a pressure ratio value (e.g., 0.10 of iFR, FFR, Pd/Pa, etc.) attributable to an occlusion at that location along the vessel. In an example, a number of dots shown adjacent to the vessel at a particular location is indicative of a relative pressure or fractional reserve at that location (e.g., a pressure drop of ⅔ or 33.3% between the two locations shown), certain values of which may be indicative of a stenosis, lesion, thrombus, plaque, or compression in between the two locations. Co-registration of the intraluminal physiological measurements 530 with the roadmap image 420 permits a clinician or other user to see, at a glance, precisely where in the vessel 100 the measurements 530 were taken, and what the relative values were. This readability and position certainty may be associated with improved clinical outcomes.

Figure 12:
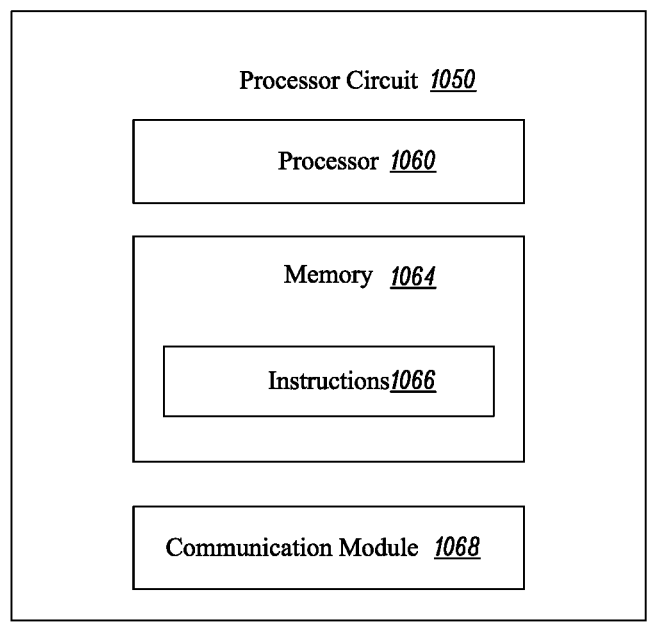
FIG. 12 is a schematic diagram of a processor circuit, according to embodiments of the present disclosure.

FIG. 12 is a schematic diagram of a processor circuit 1050, according to embodiments of the present disclosure. The processor circuit 1050 may be implemented in the ultrasound imaging system 500, or other devices or workstations (e.g., third-party workstations, network routers, etc.), or on a cloud processor or other remote processing unit, as necessary to implement the method. As shown, the processor circuit 1050 may include a processor 1060, a memory 1064, and a communication module 1068. These elements may be in direct or indirect communication with each other, for example via one or more buses.

The processor 1060 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1060 may also comprise another hardware device, a firmware device, or any combination thereof configured to perform the operations described herein. The processor 1060 may also be implemented as a combination of computing devices, e.g., a combination of a DSP and a microprocessor, a plurality of microprocessors, one or more microprocessors in conjunction with a DSP core, or any other such configuration.

The memory 1064 may include a cache memory (e.g., a cache memory of the processor 1060), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1064 includes a non-transitory computer-readable medium. The memory 1064 may store instructions 1066. The instructions 1066 may include instructions that, when executed by the processor 1060, cause the processor 1060 to perform the operations described herein. Instructions 1066 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 1068 can include any electronic circuitry and/or logic circuitry to facilitate direct or indirect communication of data between the processor circuit 1050, and other processors or devices. In that regard, the communication module 1068 can be an input/output (I/O) device. In some instances, the communication module 1068 facilitates direct or indirect communication between various elements of the processor circuit 1050 and/or the ultrasound imaging system 500. The communication module 1068 may communicate within the processor circuit 1050 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the ultrasound device) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Figure 13:
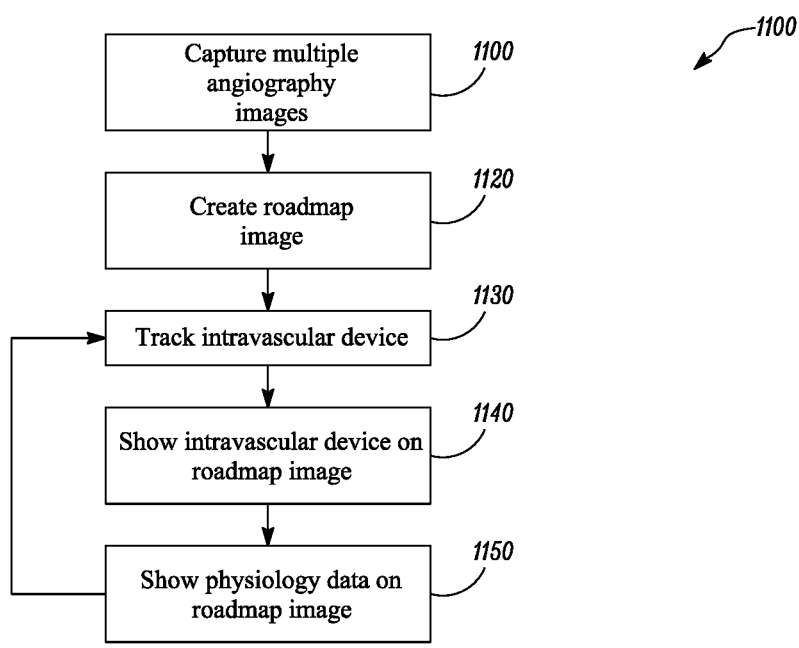
FIG. 13 shows a flow diagram of an example intravascular co-registration method according to at least one embodiment of the present disclosure.

FIG. 13 shows a flow diagram of an example intravascular co-registration method 1100 according to at least one embodiment of the present disclosure. It is understood that the steps of method 1100 may be performed in a different order than shown in FIG. 13, additional steps can be provided before, during, and after the steps, and/or some of the steps described can be replaced or eliminated in other embodiments. One or more of steps of the method 1100 can be carried by one or more devices and/or systems described herein, such as components of the system 150, system 500, and/or processor circuit 1050.

In step 1110, the method 1100 includes capturing a series of external images 620 (e.g., x-ray angiography images) that are sufficient to fully cover the lumen segment of interest (e.g., a vessel segment in which a stenosis or other disease is suspected). This may be done for example by moving an x-ray scanner with respect to a patient (e.g., down the length of a patient's limb) and capturing successive, overlapping images 620 of the vascular anatomy, while retaining detailed knowledge (e.g., a transformation matrix) of the position and/or orientation of the sensor at the time each image is captured. In an example, the position of the external imaging sensor 630 is kept constant while the series of images is captured, but the position of the sensor is translated along the length of the lumen, approximately parallel to the lumen.

In step 1120, the method 1100 includes creating a roadmap image 420 by stitching together at least some of the series of external images 620 into a single, seamless image including all the features of the individual images 620. This stitching may be accomplished using the positions and orientations of the external imaging sensor 630, or the pixel details of the images themselves, or any combination thereof, as described above in FIG. 9.

In step 1130, the method 1100 includes tracking the location of the intraluminal probe or device 502, using real-time images from the external imaging sensor 630 (e.g., a fluoroscopic x-ray imager), along with real-time information about the location and orientation of the external imager, and using image recognition algorithms to identify and locate radiopaque features on the intraluminal imaging probe within the real-time images. The intraluminal probe or device 502 can be tracked while moving through the lumen and collecting medical data. The medical data can be collected by the device 502 in multiple segments of the vessel (e.g., the segments that are joined together to form the combined length of the vessel in the roadmap image). For example, an intravascular catheter or guidewire can be tracked while moving though a blood vessel lumen and obtaining intravascular data. When the location of the intraluminal probe 502 is known, the system translates it into the same coordinate system as the roadmap image.

In step 1140, some embodiments of the method 1100 indicate the current position of the intraluminal probe or device 502 on the roadmap image 420 as displayed on the display or monitor 508. This may be done for example by overlaying a graphical position indicator 425 on the roadmap image 420. In some embodiments, this co-registration and display are accomplished by the system in real time during the pullback procedure. In other embodiments, co-registration and display is performed in a review mode after the pullback procedure is complete.

In step 1150, if physiology data is available, the physiology data, such as a graphical representation associated with the physiology data, may optionally be displayed on the roadmap 420 as well, in the location along the vessel 100 where the physiology data was captured. The physiology data may include direct measurements such as pressure, as well as computed quantities (e.g., pressure ratios), such as Pd/Pa, iFR, and FFR that are derived from the direct measurements. For example, execution then returns to step 1130, unless the procedure is over, in which case execution terminates.

A number of variations are possible on the examples and embodiments described above. For example, the intravascular co-registration system may be employed in anatomical systems within the body other than those described, or may be employed to image other disease types, object types, or procedure types than those described. The technology described herein may be applied to intraluminal imaging sensors of diverse types, whether currently in existence or hereinafter developed. The system may be employed with IVUS for coronary arterial and peripheral use in arterial or venous imaging. Alternatively or in addition, the system may be employed with X-ray, angiogram, and venogram applications that require or enable labels and bookmarks.

Accordingly, the logical operations making up the embodiments of the technology described herein are referred to variously as operations, steps, objects, elements, components, or modules. Furthermore, it should be understood that these may occur or be performed in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the intravascular co-registration system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the intravascular co-registration system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system, comprising:
    a processor circuit configured for communication with an x-ray imaging device movable relative to a patient and an intravascular catheter or guidewire sized and shaped for positioning within a blood vessel of the patient, wherein the processor circuit is configured to:
        receive intravascular data obtained by the intravascular catheter or guidewire during a pullback spanning a distance of the blood vessel that is longer than a distance that the x-ray imaging device is configured to capture in a single x-ray image frame such that the intravascular data spans the distance of the blood vessel, wherein the distance of the blood vessel comprises a first length of the blood vessel and a second length of the blood vessel;
        generate a roadmap image of the blood vessel, wherein the roadmap image comprises a combination of a first x-ray image of the first length and a second x-ray image of the second length, wherein the first x-ray image and the second x-ray image are obtained with contrast agent inside of the blood vessel, wherein the first x-ray image is obtained with the x-ray imaging device at a first position relative to the patient and the second x-ray image is obtained with the x-ray imaging device at a second position relative to the patient;
        co-register the intravascular data spanning the distance of the blood vessel to corresponding locations of the first length and the second length in the roadmap image; and
        output, to a display in communication with the processor circuit, a screen display comprising:
            the roadmap image; and
            a graphical representation of the intravascular data at the corresponding locations in the roadmap image.

2. The system of claim 1, wherein the processor circuit generating the roadmap image includes at least one of rotating or translating the first x-ray image and the second x-ray image such that the first x-ray image and the second x-ray image are in a same coordinate system.

3. The system of claim 1, wherein the processor circuit generating the roadmap image includes:
    identifying an image landmark that is common to the first x-ray image and the second x-ray image; and
    rotating and/or translating at least one of the first x-ray image or the second x-ray image such that the image landmark in the first x-ray image is aligned with the image landmark in the second x-ray image.

4. The system of claim 1, wherein the processor circuit is further configured to:
    identify a real-time set comprising at least one of positions or orientations of the x-ray imaging device during the pullback;
    calculate a location of the intravascular catheter or guidewire using the real-time set and live imaging from the x-ray imaging device of the intravascular catheter or guidewire within the blood vessel, wherein the live imaging is different from the first and second x-ray images;
    provide the location of the intravascular catheter or guidewire in a coordinate system of the roadmap image; and
    output, to the display, an indicator of the location of the intravascular catheter or guidewire on the roadmap image, at a position on the roadmap image corresponding to the location of the intravascular catheter or guidewire within the blood vessel.

5. The system of claim 4, wherein the processor circuit is further configured to, in real time:
    recalculate the location of the intravascular catheter or guidewire as the intravascular catheter or guidewire is moved within the blood vessel of the patient during the pullback;

provide the recalculated location of the intravascular catheter or guidewire in the coordinate system of the roadmap image; and update, on the display, the indicator of the location of the intravascular catheter or guidewire on the roadmap image.

6. The system of claim 1, wherein the intravascular catheter or guidewire comprises an imaging sensor, wherein the intravascular data comprises imaging data obtained by the imaging sensor, and wherein the processor circuit is further configured to:

generate a cross-sectional image based on the imaging data at a location of the intravascular catheter or guidewire within the blood vessel of the patient; and output, to the display, the cross-sectional image along with the roadmap image.

7. The system of claim 6, wherein the imaging sensor is an ultrasound sensor or optical coherence tomography sensor.

8. The system of claim 1, wherein the intravascular catheter or guidewire comprises a physiological sensor, wherein the intravascular data comprises physiological data obtained by the physiological sensor at a location of the intravascular catheter or guidewire within the blood vessel, and wherein the processor circuit is further configured to:

receive the physiological data from the physiological sensor; and output, to the display, a graphical representation associated with the physiological data at a position on the roadmap image corresponding to the location of the intravascular catheter or guidewire within the blood vessel of the patient where the physiological data was obtained.

9. The system of claim 8, wherein the physiological sensor is a pressure sensor or a flow sensor.

10. The system of claim 8, wherein the processor circuit is further configured to compute a physiological quantity based on the physiological data obtained at one or more locations, and wherein the graphical representation is based on the physiological quantity.

11. A method, comprising:

receiving, at at a processor circuit in communication with an x-ray imaging device and an intravascular catheter or guidewire and, intravascular data obtained by the intravascular catheter or guidewire during a pullback spanning a distance of the blood vessel that is longer than a distance that the x-ray imaging device is configured to capture in a single x-ray image frame such that the intravascular data spans the distance of the blood vessel, wherein the distance of the blood vessel comprises a first length of the blood vessel and a second length of the blood vessel;

generating, with the processor circuit, a roadmap image of the blood vessel, wherein the roadmap image comprises a combination of a first x-ray image of the first length and a second x-ray image of the second length, wherein the first x-ray image and the second x-ray image are obtained with contrast agent inside of the blood vessel, wherein the first x-ray image is obtained with the x-ray imaging device at a first position relative to the patient and the second x-ray image is obtained with the x-ray imaging device at a second position relative to the patient, co-registering, with the processor circuit, the intravascular data spanning the distance of the blood vessel to corresponding locations of the first length and the second length in the roadmap image; and outputting, to a display in communication with the processor circuit, a screen display comprising:

the roadmap image; and a graphical representation of the intravascular data at the corresponding locations in the roadmap image.

12. The system of claim 1, further comprising the intravascular catheter or guidewire.

13. The system of claim 1, further comprising the x-ray imaging device.

\* \* \* \* \*